US012617892B2

(12) United States Patent
Quell et al.

(10) Patent No.: US 12,617,892 B2
(45) Date of Patent: May 5, 2026

(54) APPLICATION OF THE RING-OPENING OF URETDIONES AT LOW TEMPERATURE AND AMBIENT ATMOSPHERE

(71) Applicant: BASF SE, Ludwigshafen am Rhein (DE)

(72) Inventors: Aggeliki Quell, Ludwigshafen am Rhein (DE); Florian Ludwig Geyer, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 556 days.

(21) Appl. No.: 18/006,146

(22) PCT Filed: Jul. 22, 2021

(86) PCT No.: PCT/EP2021/070555

§ 371 (c)(1),
(2) Date: Jan. 19, 2023

(87) PCT Pub. No.: WO2022/018213

PCT Pub. Date: Jan. 27, 2022

(65) Prior Publication Data

US 2023/0323013 A1 Oct. 12, 2023

(30) Foreign Application Priority Data

Jul. 23, 2020 (EP) .................................... 20187450

(51) Int. Cl.
*C08G 18/79* (2006.01)
*C08G 18/10* (2006.01)
*C08G 18/20* (2006.01)

(52) U.S. Cl.
CPC ........... *C08G 18/798* (2013.01); *C08G 18/10* (2013.01); *C08G 18/20* (2013.01)

(58) Field of Classification Search
CPC ....... C08G 18/798; C08G 18/10; C08G 18/20
See application file for complete search history.

(56) References Cited

U.S. PATENT DOCUMENTS

| | | | | |
|---|---|---|---|---|
| 6,806,345 B2 | 10/2004 | Hofmann et al. | | |
| 6,914,115 B2 * | 7/2005 | Spyrou | C08G 18/798 427/393 | |
| 7,521,521 B2 | 4/2009 | Bruchmann et al. | | |
| 2005/0165177 A1 | 7/2005 | Wagner et al. | | |
| 2006/0052527 A1 | 3/2006 | Weikard et al. | | |
| 2010/0152404 A1 | 6/2010 | Flosbach et al. | | |
| 2010/0298490 A1 | 11/2010 | Caiozzo et al. | | |
| 2014/0288237 A1 * | 9/2014 | Berge | C08G 18/798 524/590 | |
| 2021/0253782 A1 | 8/2021 | Desbois et al. | | |

FOREIGN PATENT DOCUMENTS

| | | | |
|---|---|---|---|
| DE | 10138216 | 2/2003 | |
| DE | 10147712 | 4/2003 | |
| WO | 03/093343 | 11/2003 | |
| WO | 2005/026234 | 3/2005 | |
| WO | WO-2019175709 A1 * | 9/2019 | C08G 18/798 |
| WO | 2020/016276 | 1/2020 | |

OTHER PUBLICATIONS

A. Davis, "Dimerisation and Trimerisation of 2,4 Tolylene Diisocyanate", Die Makromolekulare Chemie, May 20, 1963, pp. 196-204.
Dardel et al., "Ion Exchangers", Ullmann's Encyclopedia of Industrial Chemistry, Electronic Release 2007, 2012 Wiley-VCH Verlag Gmbh & Co. KGaA, Weinheim, vol. 19, 2012, pp. 474-545.
Hölter et al., "Degree of branching in hyperbranched polymers", Acta Polymer, vol. 48, 1997, pp. 30-35.
Paul J. Flory, "Molecular Size Distribution in Three Dimensional Polymers. VI. Branched Polymers Containing A-R-B $_{f-1}$ type units", J. Am. Chem. Soc., vol. 74, Jun. 5, 1952, pp. 2718-2723.
Querat et al., "Blocked Isocyanate", Die Angewandte Makromolekulare Chemie vol. 242, 1996, pp. 1-36, with English translation.
Risch et al., "Preparation, Characterization and Selective Reactions of Novel [1,3] Diazetidine-2,4-diones (Uretdiones)—A New Route to Generate Asymmetric Substituted Toluylenediisocyanate-Derivatives", Journal Prakt. Chem., vol. 341, No. 7, Apr. 13, 1999, pp. 616-619.
Singh et al., "Studies on the Stability of the Dimer of 2,4-Tolylene Diisocyanate", Canadian Journal of Chemistry, vol. 40, 1962, pp. 935-940.
Sunder et al., "Controlling the growth of Polymer Trees: Concepts and Perspectives for Hyperbranched Polymers", Concepts, Chem. Eur. J., vol. 6, No. 14, 2000, pp. 2499-2506.
International Search Report dated Oct. 13, 2021, in PCT/EP2021/070555, 4 pages.
International Preliminary Report on Patentability dated Jan. 24, 2023, in PCT/EP2021/070555, 10 pages.
Written Opinion dated Oct. 13, 2021, in PCT/EP2021/070555, 8 pages.

* cited by examiner

*Primary Examiner* — Michael L Leonard
(74) *Attorney, Agent, or Firm* — Grüneberg Global IP, PLLC

(57) ABSTRACT

A process for preparing a polymer containing a structural element —N—C(═O)—$X^2$— involves: (a) providing an uretdione of formula (I), and (b) opening a ring of the uretdione at a temperature greater than 50° C. and in the presence of a catalyst composition containing at least one catalyst, to obtain the polymer. In the element —N—C(═O)—$X^2$, $X^2$ is a derivative of the group $X^1$ reactive towards isocyanates. The polymer containing the element —N—C(═O)—$X^2$— obtained from the process is useful. A method for modifying polymers which have reactive groups towards isocyanate groups involves: (i) providing a polymer having at least one functional group reactive towards isocyanate groups; (ii) providing an uretdione, of formula (II); and (iii) reacting the polymer with the uretdione at a temperature of more than 50° C., in the presence of a catalyst composition containing at least one catalyst. The modified polymer obtained according to the method is useful.

18 Claims, No Drawings

APPLICATION OF THE RING-OPENING OF URETDIONES AT LOW TEMPERATURE AND AMBIENT ATMOSPHERE

CROSS-REFERENCE TO RELATED APPLICATIONS

This application is the National Stage entry under § 371 of International Application No. PCT/EP2021/070555, filed on Jul. 22, 2021, and which claims the benefit of priority to European Application No. 20187450.0, filed on Jul. 23, 2020. The content of each of these applications is hereby incorporated by reference in its entirety.

BACKGROUND OF THE INVENTION

Field of the Invention

In a first aspect, the invention relates to a process for preparing a polymer comprising a structural element —N—C(═O)—$X^2$—, wherein the process comprises (a) Providing an uretdione of formula (I) and (b) ring opening of the uretdione of formula (I) provided according to (a) at a temperature of more than 50° C., and in the presence of a catalyst composition comprising at least one catalyst C, thereby obtaining a polymer comprising a structural element —N—C(═O)—$X^2$, wherein $X^2$ is a derivative of the group $X^1$ reactive towards isocyanates. A second aspect of the invention relates to a polymer comprising a structural element —N—C(═O)—$X^2$— obtained or obtainable from the process according to the first aspect. A third aspect of the invention is directed to a method for modifying polymers, which have reactive groups towards isocyanate groups, the method comprising: (i) providing a polymer having at least one, preferably at least two, functional groups which are reactive towards isocyanate groups; (ii) providing an uretdione of formula (II); and (iii) reacting the polymer having at least one functional group reactive towards isocyanate groups of (i) with the uretdione of formula (II) of (ii) at a temperature of more than 50° C., in the presence of a catalyst composition comprising at least one catalyst C. In a fourth aspect, the invention relates to a modified polymer obtained or obtainable according to the method of the second aspect. A fifth aspect of the invention relates to an uretdione of formula (II) as defined in view of the method of the second aspect.

Description of Related Art

The synthesis of toluene diisocyanate-uretdione (TDI-uretdione) has long been described in literature [A. Davis, Dimerisation and Trimerisation of 2,4 Tolylene Di-isocyanate, Die Makromolekulare Chemie, 1963, 196-204]. 2,4-TDI reacts with itself to TDI-uretdione. The reaction is reversible at high temperature. The potential for a selective addition chemistry to TDI has likewise been long noted. Singh and Boivin [P. Singh, J. L. Boivin, Canadian Journal of Chemistry, 1962, 935-940] described the syntheses of several bisadducts from TDI with urea and carbamate moieties by reacting both NCO from TDI-uretdione with amines or alcohols. Risch et al. [N. Risch, U. Westerwelle, J. Kiene, R. Keuper, Preparation, Characterization and Selective Reactions of Novel [1,3]Diazetidine-2,4-diones (Uretdiones)—A New Route to Generate Assymetric Substituted Toluylenediisocyanate-Derivatives, J. Prakt. Chem, 1999, 341, 616-619] demonstrate the usage of the uretdione-ring as a protected NCO-group and selectively cleave the 4-membered ring under presence of another nucleophile and a phosphine catalyst.

US 2010/298490 A1 discloses a method of making an oligomer, comprising reacting one mole of a uretdione compound. Inter alia, a hydroxyl propyl carbamate-capped hexamethylene diisocyanate (HDI) urethdione is ring-opened using zinc acetylacetonate hydrate as catalyst. US 2006/052527 A1 discloses a process for preparing a binder. An urethane acrylate containing uretdione groups is prepared by using an HDI uretdione which is reacted with 2-HEA. The urethane acrylate containing uretdione groups is further reacted with a polyether triol in the presence of zinc(II)ethylhexanoate as catalyst, thereby resulting in a ring-opening of the uretdione groups. US 2010/152404 A1 discloses a process for preparing a carboxyl functional polyuretdione resin composition; zinc hexadecanoat, tin hexadecanoat, zinc acetylacetonate, and zinc acetate are described as suitable catalysts.

Querat et al. [E. Querat, L. Tighzert, J. P. Pascault, K. Dusek, Die Angewandte Makromolekulare Chemie, 242, 1996, 1-36] shortly review the synthesis of uretdiones by catalysis with phosphines or a mixture of pyridine with triethylamine before studying the thermal dissociation without a catalyst and with three different potential catalysts. Without catalyst, the hydroxyl group (OH) of polycaprolactone reacted with free isocyanate (NCO) of the TDI-dimer between 90-150° C. The ring-opening and reaction with the OH functions of the polycaprolatone with the uretdione/regenerated NCO could be found between 160-220° C. The authors also showed that upon storage in mixture with polycaprolactone at 40° C. for 8 days, no uretdione ring opening occurred. Triethylamine (TEA), tributylphosphine (TBP) and dibutyltin dilaureate (DBTL) were compared for the reaction of TDI-uretdione with polycaprolactone and examined by DSC. Two distinct reactions could be observed with TEA and TBP. Triethylamine performed worst, only shifting the initial reaction of the free NCO from 110° C. to 100° C. Similarly, the phosphine only slightly shifted this first addition. In difference to TEA the TBP catalyzed the ring opening of the uretdione. DBTL not only catalyzed the reaction of the free NCO with OH, but also the generation of allophonates from the uretdione, hence a different reaction mechanism takes place. The allophonates could be cleaved to the desired products only at high temperature.

While TBP is an efficient catalyst system that seems to work at relatively moderate temperature, its sensitivity towards oxygen renders it hard to employ in many technical settings. There is a clear demand for an uretdione-cyclorеversion-catalyst or catalyst system that has a broader scope.

SUMMARY OF THE INVENTION

The objective technical problem underlying the present invention was the provision of a process which overcomes the drawbacks mentioned above.

The problem has been solved by a process for preparing a polymer comprising a structural element —N—C(═O)—$X^2$—, wherein the process comprises a) Providing an uretdione of formula (I)

(I)

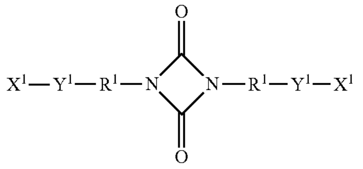

wherein $R^1$ is selected from:

branched and unbranched C1 to C20-alkylene group;

substituted or unsubstituted C4 to C20-cycloalkyl group, wherein a substituted C4 to C20-cycloalkyl group has one or more substituents independently selected from branched or unbranched C1 to C8-alkyl group, wherein each C4 to C20-cycloalkyl group is either directly bonded to $Y^1$ or is bonded via a $CH_2$ group to $Y^1$ and is either directly bonded to the nitrogen atom of the uretdione structure or via a $CH_2$ group;

C1 to C5 alkyl-bridged dicyclohexyl group;

Substituted or unsubstituted C6 to C14-aryl group, wherein a substituted C6 to C14-aryl group has one or more substituents independently selected from branched or unbranched C1 to C8-alkyl group;

C1 to C5-alkyl-bridged di-C6 to C14-aryl group, wherein each C6 to C14-aryl group is unsubstituted or substituted with one or more substituents independently from branched or unbranched C1 to C8-alkyl group;

$X^1$ is a group reactive towards isocyanantes, preferably $X^1$ is selected from the group consisting of OH group, $NH_2$ group, and $NR^3H$ $Y^1$ is a linker group, wherein $Y^1$ is absent or selected from the group consisting of $-NH-C(=O)-[R^2-]-$, $-NH-C(=O)-O-[CH_2]_n-$, $-NH-C(=O)-O-[R^1]_n-$, each with the nitrogen-atom being attached to $R^1$, $-[CH_2]_n-$, $-[R^2]-$, $-NH-C(=O)-NH-[R^1]_n-$, $-[R^1]_n-$, $-NH-C(=O)-NH$-cyclohexyl-, which has at least one $CH_3$ group on the cyclohexyl ring, $-NH$-cyclohexyl-, which has at least one $CH_3$ group on the cyclohexyl ring, $-NH-C(=O)-NR^3-[R^1]_n-$, $-[R^1]_n-$, $-NH-C(=O)-NR^3$-cyclohexyl which has at least one $CH_3$ group on the cyclohexyl ring, $-NR^3$-cyclohexyl-, which has at least one $CH_3$ group on the cyclohexyl ring, and $R^1$;

wherein $R^1$ is as defined above, $R^2$ is a polyetherpolyol residue having on each side a terminal oxygen atom based on ethylene oxide, propylene oxide, butylene oxide or mixtures thereof, with 1-100 repeating units, preferred 1-60 repeating units, more preferred 1-30 repeating units, more preferred 1-15 repeating units or $-[(CH_2)_4-O]_r-$ with r being an integer in the range of from 1-100, preferred in the range of from 1-60, more preferred in the range of from 1-30, more preferred in the range of from 1-15; and mixtures of polyetherpolyol residues having on each side a terminal oxygen atom based on ethylene oxide, propylene oxide, butylene oxide or mixtures thereof with p repeating units and $-[(CH_2)_4-O]_r$, wherein the sum of p and r is an integer in the range of from 1-100, preferred in the range of from 1-60, more preferred in the range of from 1-30, more preferred in the range of from 1-15, $R^3$ is selected from the group consisting of methyl group, ethyl group, propyl group, isopropyl group, butyl group, iso-butyl group, ethyl hexyl group and benzyl group; and n is zero or an integer in the range of from 1 to 12;

b) ring opening of the uretdione of formula (I) provided according to (a)

at a temperature of more than 50° C., in the presence of a catalyst composition comprising at least one catalyst C, thereby obtaining a polymer comprising a structural element $-N-C(=O)-X^2$, wherein $X^2$ is a derivative of the group $X^1$ reactive towards isocyanates, preferably $X^2$ is selected from the group consisting of oxygen atom ($-O-$), $-NH-$ group, and $-NR^3-$, wherein $R^3$ is as defined above.

The ring opening of the uretdione of formula (I) in the presence of a catalyst composition comprising at least one catalyst C results in a ring opening of the central uretdione structure element,

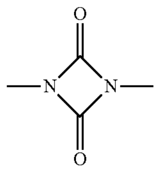

which results in a split-up into two monomeric units. Each monomeric unit consisting of $NCO-R^1-Y^1-X^1$. The outer groups NCO and $X^1$ react with each other resulting in formation of a polymer.

DETAILED DESCRIPTION OF THE INVENTION

In a first embodiment of the process, $X^1$ in the uretdione of formula (I) according to (a) is a hydroxyl group and Y is selected from the group consisting of $-NH-C(=O)-[R^2]_n-$, $-NH-C(=O)-O-[CH_2]_n-$, $-NH-C(=O)-O-[R^1]_n-$, $-[CH_2]_n-$, and $-[R^2]-$, wherein n, $R^1$ and $R^2$ are as defined in embodiment 1. In a second embodiment of the process, $X^1$ in the uretdione of formula (I) according to (a) is a $NH_2$ group and $Y^1$ is selected from the group consisting of $-NH-C(=O)-NH-[R^1]_n-$, $-[R^1]_n-$, $-NH-C(=O)-NH$-cyclohexyl-, which has at least one $CH_3$ group on the cyclohexyl ring, and $-NH$-cyclohexyl, which has at least one $CH_3$ group on the cyclohexyl ring, wherein n and $R^1$ are as defined in embodiment 1. In a third embodiment of the process, $X^1$ in the uretdione of formula (I) according to (a) is a $NHR^3$ group and $Y^1$ is selected from the group consisting of $NH-C(=O)-NR^3-[R^1]_n-$, $-[R^1]_n-$, $-NH-C(=O)-NR^3$-cyclohexyl which has at least one $CH_3$ group on the cyclohexyl ring, and $-NR^3$-cyclohexyl-, which has at least one $CH_3$ group on the cyclohexyl ring, wherein n, $R^1$ and $R^3$ are as defined in embodiment 1.

In a preferred embodiment of the process, $R^1$ in the uretdione of formula (I) according to (a) is selected from the group consisting of $-[CH_2]_m$-group with m being an integer in the range of from 3 to 20, preferably in the range of from 5 to 7, phenylene group (1,2-phenylene group, 1,3-phenylene group, or 1,4-phenylene group), optionally substituted with one or more substituents selected from methyl group, cyclohexylene and $CH_2$-cyclohexylene group, wherein the cyclohexylene ring is optionally substituted with one or more substituents selected from methyl group, and $-CH_2$-bridged di-C6-aryl group; preferably from the group consisting of

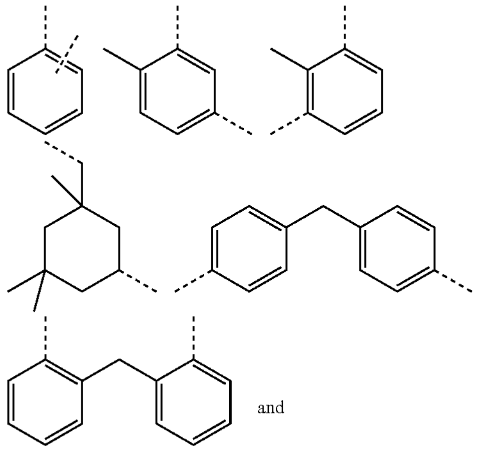

and

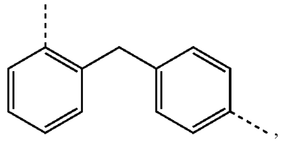

, wherein the dotted lines represent the bonds towards $Y^1$ and towards the nitrogen atom of the central uretdione structure.

In a preferred embodiment of the process, step (b) is conducted at a pressure in the range of from 500 to 2000 mbar, preferably at a pressure in the range of from 800 to 1500 mbar, more preferred at a pressure in the range of from 900 to 1200 mbar, more preferred at a pressure in the range of from 950 to 1100 mbar.

In a preferred embodiment of the process, step (b) is conducted in an atmosphere comprising more than 5 volume-%, preferably more than 10 volume-%, more preferred more than 15 volume-%, more preferred more than 20 volume-%, of oxygen, based on the total composition of the atmosphere, more preferred in ambient atmosphere (i.e. under air) or wherein step (b) is conducted in a protective atmosphere, more preferably an inert gas atmosphere, wherein the inert gas is preferably selected from the group consisting of helium, neon, argon, krypton, xenon, nitrogen and mixtures of two or more of these inert gases.

In a preferred embodiment of the process, step (b) is conducted at a temperature in the range of from 50 to 300° C.

In a preferred embodiment of the process, step (b) is conducted for a period of time of more than 5 minutes, preferably of more than 30 minutes, more preferred more than 1 hour. Preferably, step (b) is conducted for a period of time of less than 72 hours, preferably less than 48 hours, more preferred less than 24 hours. In some embodiments of the process, step (b) is conducted for a period of time in the range of from 5 minutes to 72 hours, preferably in the range of from 30 minutes to 48 hours, more preferred in the range of from 1 to 24 hour(s).

In a preferred embodiment of the process, the at least one catalyst C comprised in the catalytic composition according to step (b) is an ionic liquid. Suitable ionic liquids are disclosed in WO 2020/016276 A1 in the section "Katalysator" (see page 5, line 21 to page 23, line 6), which is herein incorporated by reference. In preferred embodiments, the at least one catalyst C comprises one or more ionic liquids, which are salts of the following formula (I)

$$[A]_n^+[Y]^{n-} \quad (I),$$

wherein n is an integer in the range of from 1 to 4;

$[A]^+$ is a quaternary ammonium cation, which comprises a five or six membered heterocycle, which comprises at least one nitrogen atom and optionally an oxygen atom or a sulfur atom, wherein the nitrogen atom of the hetero cycle is quaternised with t C1-C18 alkyl residues; and $[Y]^{n-}$ is a mono-, di-, tri-, or tetra-valent anion.

In some embodiments, $[Y]^{n-}$ is selected from the group of carboxylates $RCOO^-$, wherein R is a C1 to C30 alkyl group and halogen anion, preferably bromide or chloride.

In preferred embodiments, the at least one ionic liquid is selected from the group of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethylimidazolium bromide (EDMIM-Br), 1-(2-hydroxyethyl)-3-methyl imidazolium chloride (H EMIM-Cl), butyl-1-methylpiperidinium acetate (BMPM acetate), and mixtures of two or more thereof, preferably the catalyst composition comprises at least BMPM-Cl as ionic liquid. In some embodiments, the catalyst composition consists of one or more ionic liquids, preferably selected from the group of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethyl-imidazolium bromide (EDMIM-Br), 1-(2-hydroxyethyl)-3-methyl imidazolium chloride (HEMIM-Cl), butyl-1-methylpiperidinium acetate (BMPM acetate), and mixtures of two or more thereof, preferably the catalyst composition consists of one or more of the above mentioned ionic liquids wherein at least one thereof is BMPM-Cl.

Generally, no restrictions exist regarding the amount of catalyst composition and the molar ratio uretdione of formula (I): catalyst composition used, as long as the reaction product is a polymer comprising a structural element —N—C(═O)—$X^2$. Preferably, the concentration at which the catalyst composition, more preferably the at least one ionic liquid, is used is in the range of from 0.05 Mol-% to 5 Mol-% relative to the central uretdione structure element of the uretdione of formula (I).

In some embodiments, the catalyst composition comprises the at least one catalyst C, which comprises an ionic liquid, and one or more co-catalyst. In other words, the ionic liquid defined above can optionally be combined with one or more co-catalyst. The co-catalyst is preferably selected from the group consisting of organometallic catalyst, tertiary amine catalyst and mixtures of organometallic catalyst and tertiary amine catalyst. Preferably, the co-catalyst is an organometallic catalyst or a tertiary amine catalyst. In some embodiments, the ionic liquid defined above is combined with one or more tertiary amine catalyst, wherein the catalyst composition preferably comprises less than 1 weight-% of organometallic catalyst as co-catalyst, based on the overall weight of the catalyst composition. Preferred tertiary amines are selected from the group consisting of triethylamine, 1,4-diazabicyclo[2.2.2]octane (DABCO) and mixtures of trimethylamine and DABCO. In some embodiments, the ionic liquid defined above is combined with one or more organometallic catalyst as co-catalyst, wherein the catalyst composition preferably comprises less than 1 weight-% of tertiary amine catalyst, based on the overall weight of the catalyst composition. Preferred organometallic catalysts are selected from the group consisting of dialkyltin oxides $R^x_2SnO$, $Al(OR^x)_3$, $Ti(OR^x)_4$. Each $R^x$ is independently identical or different and is independently selected from the group consisting of C—C(=O)-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl or n-decyl; C3-C2-cycloalkyl radicals, examples being cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl. Preferably the radicals $R^x$ in $Al(OR^x)_3$ and $Ti(OR^x)_4$ are each identical and chosen from isopropyl or 2-ethylhexyl. Particularly preferred representatives of organometallic catalysts are di-n-butyltin oxide, available commercially in the form of oxo-tin, titanium tetrabutylate, titanium tetraisopropylate, dibutyl tin oxide, dibutyltin dilaureate, tin dioctoate, zirconium acetylacetonate or mixtures thereof.

In principle, ring opening of the uretdione of formula (I) in the presence of a catalyst composition comprising at least one catalyst C, can be done in any suitable atmosphere, as long as the final product is a polymer comprising a structural element —N—C(=O)—$X^2$. In preferred embodiments, ring opening of the uretdione of formula (I) in the presence of a catalyst composition comprising at least one catalyst C is done in a protective atmosphere, more preferably an inert gas atmosphere, wherein the inert gas is preferably selected from the group consisting of helium, neon, argon, krypton, radon, xenon, nitrogen and mixtures of two or more of these inert gases.

In further preferred embodiments, ring opening of the uretdione of formula (I) in the presence of a catalyst composition comprising at least one catalyst C is done in an atmosphere comprising oxygen, preferably in an atmosphere comprising more than 5 volume-%, preferably more than 10 volume-%, more preferred more than 15 volume-%, more preferred more than 20 volume-%, of oxygen, based on the total composition of the atmosphere. More preferred, ring opening of the uretdione of formula (I) provided according to (a) in the presence of a catalyst composition comprising at least one catalyst C is done in ambient atmosphere, i.e. under air.

In preferred embodiments, ring opening of the uretdione of formula (I) in the presence of a catalyst composition comprising at least one catalyst C is done at a pressure in the range of from 900 to 1100 mbar and in an atmosphere comprising more than 20 volume-%, of oxygen, based on the total composition of the atmosphere, more preferred under air.

Preferably, ring opening of the uretdione of formula (I) in the presence of a catalyst composition comprising at least one catalyst C is done in a solvent, wherein the solvent is preferably one or more organic aprotic solvent, more preferably selected from the group consisting of 1,3-dimethyl-2-imidazolidinon (DMI); dichlorobenzene, preferably 1,2, dichlorobenzene, 1,2,3-trichlorobenzene; 1,2,4-trichlorobenzene, 1,3,5-trichlorobenzene, sulfolane (tetrahydrothiophen-1,1-dioxide), dimethyl sulfoxide, benzene, toluene, xylene, mesitylene, N-methyl pyrolidone, dioxane, tetrahydrofuran, butyl acetate, propyl acetate, ethyl acetate, 4-formylmorpholine, tertbutylpyrrolidin-2-on, n-butylpyrrolidin-2-on, and mixtures of two or more of these solvents.

In alternative embodiments, the process is preferably a bulk process, wherein no solvent is used: ring opening of the uretdione of formula (I) in the presence of a catalyst composition comprising at least one catalyst C is done without any solvent.

$2^{nd}$ Aspect—Polymer Composition

A second aspect of the invention relates to a polymer comprising a structural element —N—C(=O)—$X^2$— obtained or obtainable from the process according to the first aspect

$3^{rd}$ Aspect—Method for Modifying Polymers

A third aspect of the invention is direct to a method for modifying polymers, which have reactive groups towards isocyanate groups, the method comprising:

i) providing a polymer having at least one, preferably at least two, functional groups which are reactive towards isocyanate groups;
ii) providing an uretdione of formula (II)

(II)

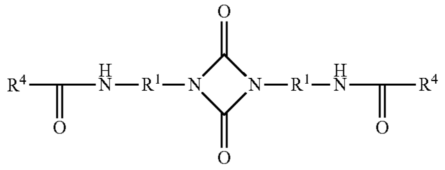

wherein
$R^4$ is a $Y^2$—$R^5$ group,
wherein
$Y^2$ is a single oxygen atom —O— or
$Y^2$ is —$NR^3$— with $R^3$ being selected from the groups consisting of hydrogen atom, methyl group, ethyl group, propyl group, isopropyl group, butyl group, iso-butyl group, ethyl hexyl group and benzyl group;
and $R^5$ is selected from
branched and unbranched C1 to C20-alkylene group;
substituted or unsubstituted C3 to C20-cycloalkyl group, wherein a substituted C3 to C20-cycloalkyl group has one or more substituents independently selected from branched or unbranched C1 to C8-alkyl group, wherein each C3 to C20-cycloalkyl group is either directly bonded to $Y^2$ or is bonded via a $CH_2$ group to $Y^2$;
Substituted or unsubstituted C6 to C14-aryl group, wherein a substituted C6 to
C14-aryl group has one or more substituents independently selected from branched or unbranched C1 to C8-alkyl group;
C1 to C5-alkyl-bridged di-C6 to C14-aryl group, wherein each C6 to C14-aryl group is unsubstituted or substituted with one or more substituents independently from branched or unbranched C1 to C8-alkyl group; and
isobornyl, bornyl, and menthyl;
or
$R^4$ is selected from:
acrylate or methacrylate,
esterification products of diol with acrylic acid and/or methacrylic acid; wherein the diol is selected from the group consisting of ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3- diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, cyclohexane dimethanols, isosorbitol, hydroxypivalinic acid neopentylglycol ester, inositol, inositol derivatives, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, difunctional polyetherpolyols based on ethylene oxide, propylene oxide, butylene oxide or mixtures thereof, with 1-100 repeating units, preferred 1-60 repeating units, more preferred 1-30 repeating units, more preferred 1-15 repeating units;

ersterification products of polytetrahydrofuran with acrylic acid and/or methacrylic acid with 1-100 repeating units, preferred 1-60 repeating units, more preferred 1-30 repeating units, more preferred 1-15 repeating units, esterification products of acrylic acid and/or methacrylic acid with at least one polyol having three or more hydroxyl groups, and mixtures of two or more of these compounds;

$R^1$ is selected from:

branched and unbranched C1 to C20-alkylene group;

substituted or unsubstituted C4 to C20-cycloalkyl group, wherein a substituted C4 to C20-cycloalkyl group has one or more substituents independently selected from branched or unbranched C1 to C8-alkyl group, wherein each C4 to C20-cycloalkyl group is either directly bonded to the nitrogen atom of the —NH— unit or is bonded via a $CH_2$ group toe nitrogen atom of the —NH— unit and is either directly bonded to the nitrogen atom of the uretdione structure or via a $CH_2$ group;

C1 to C5 alkyl-bridged dicyclohexyl group;

Substituted or unsubstituted C6 to C14-aryl group, wherein a substituted C6 to C14-aryl group has one or more substituents independently selected from branched or unbranched C1 to C8-alkyl group;

C1 to C5-alkyl-bridged di-C6 to C14-aryl group, wherein each C6 to C14-aryl group is unsubstituted or substituted with one or more substituents independently from branched or unbranched C1 to C8-alkyl group;

iii) Reacting the polymer having at least one functional group reactive towards isocyanate groups of (i) with the uretdione of formula (II) of (ii)

at a temperature of more than 50° C., in the presence of a catalyst composition comprising at least one catalyst C.

Regarding the diols used for the esterification products of diol with acrylic acid or methacrylic acid, preference is given to a diol selected from the group consisting of ethylene glycol, propane-1,2-diol, 1,4-butane diol, 1,3-butane diol, diethylene glycol, triethylene glycol, dipropylene glycol and tripropylene glycol. The at least one polyol having three or more hydroxyl groups is preferably a polyol having in the range of from 3 to 6 hydroxyl groups, more preferred selected from the group consisting of glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, tris(hydroxymethyl) isocyanurate, tris(hydroxyethyl) isocyanurate (THEIC), tris(hydroxy-isopropyl) isocyanurate, trimethylolbutane, trimethylolpropane or di-tri methylolpropane, trimethylolethane, pentaerythritol, dipentaerythritol; sugar alcohols, preferably selected from the group consisting of mesoerythritol, threitol, sorbitol, and mannitol; and mixtures two or more of these poylols. Preference is given to using one or more polyol selected from the group consisting of glycerol, trimethylolpropane, trimethylolethane and pentaerythritol. The esters of acrylic and methacrylic acid with diols, and/or polyols are attached to the carbonyl-C-atom of the uretdione structure via the residual alcohol groups. If more than one alcohol group remains, oligomeric aggregates of uretdiones of structure (II) can result.

According to a preferred embodiment of the method for modifying polymers having reactive groups towards isocyanate groups, $R^1$ in the uretdione of formula (II) according to (ii) is selected from the group consisting of an unbranched C3 to C20-alkylene group —$[CH_2]_m$— group with m being an integer in the range of from 3 to 20, preferably in the range of from 5 to 7, phenylene group (1,2-phenylene group, 1,3-phenylene group, or 1,4-phenylene group), optionally substituted with one or more substituents selected from methyl group, cyclohexylene and —$CH_2$-cyclohexylene group, wherein the cyclohexylene ring is optionally substituted with one or more substituents selected from methyl group, and —$CH_2$-bridged di-C6-aryl group; preferably from the group consisting of

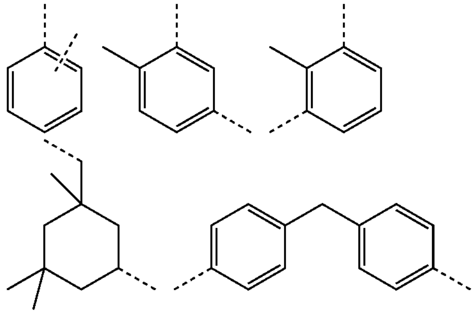

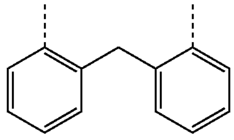

and

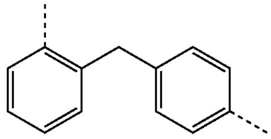

, wherein the dotted lines represent the bonds towards the nitrogen atom of the —NH— unit and towards the nitrogen atom of the central uretdione structure.

According to a preferred embodiment of the method for modifying polymers having reactive groups towards isocyanate groups, step (ii) is conducted at a pressure in the range of from 500 to 2000 mbar, preferably at a pressure in the range of from 800 to 1500 mbar, more preferred at a pressure in the range of from 900 to 1200 mbar, more preferred at a pressure in the range of from 950 to 1100 mbar.

In principle, step (ii) can be conducted in any suitable atmosphere. In some embodiments of the method for modifying polymers having reactive groups towards isocyanate groups, step (ii) is done in a protective atmosphere, more preferably an inert gas atmosphere, wherein the inert gas is preferably selected from the group consisting of helium, neon, argon, krypton, radon, xenon, nitrogen and mixtures of two or more of these inert gases According to a preferred embodiment of the method for modifying polymers having reactive groups towards isocyanate groups, step (ii) is conducted in an atmosphere comprising more than 5 volume-%, preferably more than 10 volume-%, more preferred more than 15 volume-%, more preferred more than 20 volume-%, of oxygen, based on the total composition of the atmosphere, more preferred in ambient atmosphere (i.e. under air).

According to a preferred embodiment of the method for modifying polymers having reactive groups towards isocyanate groups, step (ii) is conducted at a temperature in the range of from 50 to 300° C.

According to a preferred embodiment of the method for modifying polymers having reactive groups towards isocyanate groups, step (ii) is conducted for a period of time of more than 5 minutes, preferably of more than 30 minutes, more preferred more than 1 hour. According to a preferred embodiment of the method for modifying polymers having reactive groups towards isocyanate groups, step (ii) is conducted for a period of time of less than 72 hours, preferably less than 48 hours, more preferred less than 24 hours. Preferably, step (ii) is conducted for a period of time in the range of from 5 minutes to 72 hours, preferably in the range of from 30 minutes to 48 hours, more preferred in the range of from 1 to 24 hour(s). According to a preferred embodiment of the method for modifying polymers having reactive groups towards isocyanate groups, the at least one catalyst C comprised in the catalytic composition according to step (b) comprises at least one ionic liquid. Suitable ionic liquids for the at least one ionic liquid are disclosed in WO 2020/016276 A1 in the section "Katalysator" (see page 5, line 21 to page 23, line 6), which is herein incorporated by reference.

In preferred embodiments, the at least one catalyst C comprises one or more ionic liquids, which are salts of the following formula (I)

$$[A]_n^+[Y]^{n-} \qquad (I),$$

wherein n is an integer in the range of from 1 to 4;

$[A]^+$ is a quaternary ammonium cation, which comprises a five or six membered heterocycle, which comprises at least one nitrogen atom and optionally an oxygen atom or a sulfur atom, wherein the nitrogen atom of the hetero cycle is quaternized with t C1-C18 alkyl residues; and $[Y]^{n-}$ is a mono-, di-, tri-, or tetra-valent anion.

In some embodiments, $[Y]^{n-}$ is selected from the group of carboxylates RCOO—, wherein R is a C1 to C30 alkyl group and halogen anion, preferably bromide or chloride.

In preferred embodiments, the at least one ionic liquid is selected from the group of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethylimidazolium bromide (EDMIM-Br), 1-(2-hydroxyethyl)-3-methyl imidazolium chloride (HEMIM-Cl), butyl-1-methylpiperidinium acetate (BMPM acetate), and mixtures of two or more thereof, preferably the catalyst composition comprises at least BMPM-Cl as ionic liquid. In some embodiments, the catalyst composition consists of one or more ionic liquids, preferably selected from the group of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethyl-imidazolium bromide (EDMIM-Br), 1-(2-hydroxyethyl)-3-methyl imidazolium chloride (HEMIM-Cl), butyl-1-methylpiperidinium acetate (BMPM acetate), and mixtures of two or more thereof, preferably the catalyst composition consists of one or more of the above mentioned ionic liquids wherein at least one thereof is BMPM-Cl.

Generally, no restrictions exist regarding the amount of catalyst composition and the molar ratio uretdione of formula (I): catalyst composition used, as long as the reaction product is a polymer comprising a structural element —N—C(═O)—$X^2$. Preferably, the concentration at which the catalyst composition, more preferably the at least one ionic liquid, is used is in the range of from 0.05 Mol-% to 5 Mol-% relative to the central uretdione structure element of the uretdione of formula (I). In some embodiments, the catalyst composition comprises the at least one catalyst C, which comprises an ionic liquid, and one or more co-catalyst. In other words, the ionic liquid defined above can optionally be combined with one or more co-catalyst. The co-catalyst is preferably selected from the group consisting of organometallic catalyst, tertiary amine catalyst and mixtures of organometallic catalyst and tertiary amine catalyst. Preferably, the co-catalyst is an organometallic catalyst or a tertiary amine catalyst. In some embodiments, the ionic liquid defined above is combined with one or more tertiary amine catalyst, wherein the catalyst composition preferably comprises less than 1 weight-% of organometallic catalyst as co-catalyst, based on the overall weight of the catalyst composition. Preferred tertiary amines are selected from the group consisting of triethylamine, 1,4-diazabicyclo[2.2.2]octane (DABCO) and mixtures of trimethylamine and DABCO. In some embodiments, the ionic liquid defined above is combined with one or more organometallic catalyst as co-catalyst, wherein the catalyst composition preferably comprises less than 1 weight-% of tertiary amine catalyst, based on the overall weight of the catalyst composition. Preferred organometallic catalysts are selected from the group consisting of dialkyltin oxides $R^x{}_2SnO$, $Al(OR^x)_3$, $Ti(OR^x)_4$. Each $R^x$ is independently identical or different and is independently selected from the group consisting of C—C(═O)-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl or n-decyl; C3-C2-cycloalkyl radicals, examples being cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl. Preferably the radicals $R^x$ in $Al(OR^x)_3$ and $Ti(OR^x)_4$ are each identical and chosen from isopropyl or 2-ethylhexyl. Particularly preferred representatives of organometallic catalysts are di-n-butyltin oxide, available commercially in the form of oxo-tin, titanium tetrabutylate, titanium tetraisopropylate, dibutyl tin oxide, dibutyltin dilaureate, tin dioctoate, zirconium acetylacetonate or mixtures thereof.

According to a preferred embodiment of the method for modifying polymers having reactive groups towards isocyanate groups, the polymer according to (i) which has at least one, preferably at least two, functional groups which are reactive towards isocyanate groups, is preferably selected from the group of polyester, polyether, polycarbonate, polyacrylate, polymethacrylates and mixtures of two or more of these polymers.

According to a preferred embodiment of the method for modifying polymers having reactive groups towards isocyanate groups, (iii) is done in bulk (without solvent) or in solution in a suitable solvent or solvent mixture that is non-reactive towards NCO, preferably a solvent selected from the group consisting of 1,3-dimethyl-2-imidazolidinon (DMI); dichlorobenzene, preferably 1,2, dichlorobenzene, 1,2,3-trichlorobenzene; 1,2,4-trichlorobenzene, 1,3,5-trichlorobenzene, sulfolane (tetrahydrothiophen-1,1-dioxide), dimethyl sulfoxide, benzene, toluene, xylene, mesitylene, N-methyl pyrolidone, dioxane, tetrahydrofuran, butyl acetate, propyl acetate, ethyl acetate, 4-formyl morpholine, tertbutylpyrrolidin-2-on, n-butylpyrrolidin-2-on, and mixtures of two or more of these solvents.

The polymer according to (i) which has at least one, preferably at least two, functional groups which are reactive towards isocyanate groups, is preferably selected from the group of polyester, polyether and mixtures of polyester and polyether:

Polyesters

Polyesters having at least one, preferably at least two, functional groups which are reactive towards isocyanate groups are preferably selected from the group of hyperbranched polyesters, more preferred high-functionality hyperbranched polyesters as disclosed in WO 03/093343 A1.

The high-functionality hyperbranched polyesters have pendant or terminal functional groups selected from the group consisting of carboxy group, hydroxyl group and mixtures of carboxy group and hydroxyl group. Preferably, in the range of from 95 to 100, more preferred in the range of from 98 to 100% of the hydroxyl groups of the high-functionality hyperbranched polyesters are terminal hydroxyl groups.

The high-functionality hyperbranched polyesters are distinguished by particularly low fractions of discoloration and resinification. Regarding the definition of the hyperbranched polymers see also: P. J. Flory, J. Am. Chem. Soc. 1952, 74, 2718 and A. Sunder et al., Chem. Eur. J. 2000, 6, No. 1, 1-8.

The term "hyperbranched" means that branching is present in from 30 to 70 mol %, preferably from 40 to 60 mol %, of each monomer unit. The term "high-functionality" means that in the range of from 95 to 100 weight-%, preferably in the range of from 99 to 100 weight-% of the hyperbranched polyesters, based on the total weight of the hyperbranched polyesters, have three or more terminal functional groups, preferably in the range of from 3 to 20, more preferred in the range of from 3 to 10 terminal functional groups.

The high-functionality hyperbranched polyesters have a number average molecular weight Mn in the range of from 1000 to 50 000 g/mol, preferably from 1500 to 20 000, more preferably from 2000 to 7000 The polydispersity is in the range of from 1.2 to 50, preferably from 1.4 to 40, more preferably from 1.5 to 30, more preferably in the range of from 1.5 to 10. They are usually thus readily soluble; that is, clear solutions can be prepared with up to 50% by weight, in some cases even up to 80% by weight, of the polyesters of the invention in tetrahydrofuran (THF), n-butyl acetate, ethanol and numerous other solvents, without gel particles being detectable to the naked eye.

High-functionality hyperbranched polyesters are obtained or obtainable from reacting (i-a) one or more dicarboxylic acids or one or more derivatives thereof with one or more at least trifunctional alcohols or (i-b) one or more tricarboxylic acids or higher polycarboxylic acids, or one or more derivatives thereof with one or more diols in the presence of a solvent and optionally in the presence of an acidic inorganic, organometallic or organic catalyst.

Polyesters—Dicarboxylic Acid According to (i.a)

The dicarboxylic acids which can be reacted in accordance with option (i-a) are preferably selected from the group consisting of oxalic acid, malonic acid, succinic acid, glutaric acid, adipic acid, pimelic acid, suberic acid, azelaic acid, sebacic acid, undecane-alpha,omega-dicarboxylic acid, dodecane-alpha,omega-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid, ethylenically unsaturated acids, aromatic dicarboxylic acids, and mixtures of two or more of these dicarboxylic acids.

The abovementioned dicarboxylic acids aside from the ethylenically unsaturated acids and the aromatic dicarboxylic acids are substituted by one or more radicals selected from the group consisting of hydrogen atom, C—C20-alkyl group, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl or n-decyl, C3-C20-cycloalkyl group, such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl; alkylene groups such as methylene or ethylidene and C6-C14-aryl group, such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, more preferably phenyl.

Preferred substituted dicarboxylic acids are selected from the group consisting of 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid and mixtures of two or more of these substituted dicarboxylic acids.

Ethylenically unsaturated acids are, for example, maleic acid and fumaric acid; aromatic dicarboxylic acids are, for example, phthalic acid, isophthalic acid or terephthalic acid.

The dicarboxylic acids can be used either as they are or in the form of derivatives. By derivatives are meant preferably the corresponding anhydrides in monomeric or else polymeric form, mono- or dialkyl esters, preferably mono- or dimethyl esters or the corresponding mono- or diethyl esters, but also the mono- and dialkyl esters derived from higher alcohols such as n-propanol, isopropanol, n-butanol, isobutanol, tert-butanol, n-pentanol and n-hexanol, for example, additionally mono- and divinyl esters, and also mixed esters, preferably methyl ethyl esters.

It is also possible to use a mixture of dicarboxylic acid and one or more of its derivatives. Likewise, it is possible in the context of the present invention to use a mixture of two or more different derivatives of one or more dicarboxylic acids.

Particular preference is given to one or more dicarboxylic acids selected from the group consisting of succinic acid, glutaric acid, adipic acid, phthalic acid, isophthalic acid, terephthalic acid and the mono- or dimethyl esters of these dicarboxylic acids. Very particular preference is given to using one or more dicarboxylic acids selected from the group consisting of adipic acid, cis-1,2-cyclohexane dicarboxylic acid and trans-1,2-cyclohexane dicarboxylic acid.

Polyesters—At Least Trifunctional Alcohol According to (i-a)

At least trifunctional alcohols according to (i-a) are selected from the group consisting of glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, tris(hydroxymethyl) isocyanurate, tris(hydroxyethyl) isocyanurate (THEIC), tris(hydroxy-isopropyl) isocyanurate, trimethylolbutane, trimethylolpropane or di-trimethylolpropane, trimethylolethane, pentaerythritol or dipentaerythritol; sugar alcohols such as mesoerythritol, threitol, sorbitol, mannitol, for example, and mixtures of these at least trifunctional alcohols. Preference is given to using one or more of glycerol, trimethylolpropane, trimethylolethane and pentaerythritol.

Polyesters—Tricarboxylic Acids or Higher Polycarboxylic Acids According to (i-b)

Tricarboxylic acids or polycarboxylic acids which can be reacted in accordance with option (i-b) are selected from the group consisting of 1,2,4-benzenetricarboxylic acid, 1,3,5-benzenetricarboxylic acid, 1,2,4,5-benzenetetracarboxylic acid, mellitic acid, and mixtures of two or more thereof.

In the reaction according to the invention tricarboxylic acids or polycarboxylic acids can be used either as they are or else in the form of derivatives.

By derivatives are meant preferably the corresponding anhydrides in monomeric or else polymeric form, mono-, di- or trialkyl esters, preferably mono-, di- or trimethyl esters or the corresponding mono-, di- or triethyl esters, but also the mono- di- and triesters derived from higher alcohols such as n-propanol, isopropanol, n-butanol, isobutanol, tert-butanol, n-pentanol and n-hexanol, for example, and also mono-, di- or trivinyl esters, and also mixed methyl ethyl esters.

It is also possible to use a mixture of a tricarboxylic or polycarboxylic acid and one or more of its derivatives. Likewise it is possible in the context of the present invention to use a mixture of two or more different derivatives of one or more tricarboxylic or polycarboxylic acids.

Polyesters—Diols According to (i-b)

The one or more diols for option (i-b) is selected from the group consisting of ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, cyclohexane dimethanols, isosorbitol, hydroxypivalinic acid neopentylglycol ester, inositol, inositol derivatives, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H or mixtures of two or more of these compounds, n being an integer in the range of from 2 to 10. One or both of the hydroxyl groups in the aforementioned diols can also be substituted by SH groups. Preference is given to ethylene glycol, propane-1,2-diol and also diethylene glycol, triethylene glycol, dipropylene glycol and tripropylene glycol.

The molar ratio of hydroxyl groups to carboxyl groups in the case of options (i-a) and (i-b) are in the range of from 2:1 to 1:2, in particular from 1.5:1 to 1:1.5.

The at least trifunctional alcohols which are reacted in accordance with option (i-a) may have hydroxyl groups each of equal reactivity regarding polycondensation. Preference is also given here to at least trifunctional alcohols whose OH groups are initially of equal reactivity but in which by reaction with at least one acid group it is possible to induce a drop in reactivity, caused by steric or electronic influences, among the remaining OH groups. This is the case, for example, when trimethylolpropane or pentaerythritol is used.

The at least trifunctional alcohols which are reacted in accordance with option (i-a) may also, however, contain hydroxyl groups having at least two chemically different reactivities. The different reactivity of the functional groups may derive either from chemical causes (e.g., primary/secondary/tertiary OH group) or from steric causes. By way of example the triol may be a triol which contains primary and secondary hydroxyl groups: a preferred example is glycerol.

When carrying out the reaction in accordance with option (i-a) it is preferred to operate in the absence of diols and monofunctional alcohols.

When carrying out the reaction in accordance with option (i-b) it is preferred to operate in the absence of monocarboxylic or dicarboxylic acids.

The process is optionally conducted in the presence of a solvent. If a solvent is used, the solvent is selected from the group consisting of hydrocarbons such as paraffins, aromatics, and mixtures of hydrocarbons and aromatics. Particularly suitable paraffins are n-heptane and cyclohexane. Particularly suitable aromatics are toluene, ortho-xylene, meta-xylene, para-xylene, xylene isomer mixture, ethylbenzene, chlorobenzene and ortho- and meta-dichlorobenzene. Additional solvents which are especially suitable in the absence of acidic catalysts include the following: ethers such as dioxane or tetrahydrofuran and ketones such as methyl ethyl ketone and methyl isobutyl ketone, for example. The amount of added solvent is at least 0.1% by weight, based on the mass of the starting materials to be reacted that are used, preferably at least 1% by weight and more preferably at least 10% by weight. It is also possible to employ excesses of solvent, based on the mass of starting materials to be reacted that are employed, such as from 1.01 to 10 times, for example. Solvent amounts of more than 100 times, based on the mass of starting materials to be reacted that are employed, are not advantageous, since at significantly lower concentrations of the reactants the reaction rate falls markedly, leading to uneconomically long reaction times.

It is possible to operate in the presence of a water remover additive which is added at the beginning of the reaction. Suitable examples include molecular sieves, particularly molecular sieve 4 Å, $MgSO_4$ and $Na_2SO_4$. It is also possible during the reaction to add further water remover additive or to replace water remover additive by fresh water remover additive. It is also possible to distill off water or alcohol formed during the reaction and to use, for example, a water separator.

Polyesters—Acidic Catalyst

The process can be conducted in the absence of acidic catalysts. It is preferred to operate in the presence of an acidic inorganic, organometallic or organic catalyst or mixtures of two or more acidic inorganic catalysts, acidic organometallic catalysts or acidic organic catalysts.

Acidic inorganic catalysts are selected from the group consisting of sulfuric acid, phosphoric acid, phosphonic acid, hypophosphorous acid, aluminum sulfate hydrate, alum, acidic silica gel (pH in the range of from 4 to 6, in particular pH=5), acidic alumina, alumium compounds of the general formula $Al(OR^x)_3$, titanates of the general formula $Ti(OR^x)_4$, and mixtures of two or more of these acidic inorganic catalysts. Each $R^x$ is idenpendently identical or different and is independently selected from the group consisting of C—C(═O)-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl or n-decyl; C3-C2-cycloalkyl radicals, examples being cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl. Preferably the radicals $R^x$ in $Al(OR^x)_3$ and $Ti(OR^x)_4$ are each identical and chosen from isopropyl or 2-ethylhexyl.

Preferred acidic organometallic catalysts are selected from the group consisting of dialkyltin oxides $R^x_2SnO$, where $R^x$ is as defined above for $Al(OR^x)_3$ and $Ti(OR^x)_4$. One particularly preferred representative of acidic organometallic catalysts is di-n-butyltin oxide, available commercially in the form of oxo-tin.

Preferred acidic organic catalysts are acidic organic compounds containing, for example, phosphate groups, sulfonic acid groups, sulfate groups or phosphonic acid groups. Particular preference is given to sulfonic acids such as para-toluenesulfonic acid. Acidic ion exchangers can also be used as acidic organic catalysts, examples being polystyrene resins which contain sulfonic acid groups and have been crosslinked with about 2 mol % of divinylbenzene.

Combinations of two or more of the aforementioned catalysts can also be used. Another possibility is to use those acidic organic catalysts or acidic organometallic catalysts or else inorganic catalysts which are in the form of discrete molecules, in an immobilized form.

If acidic catalysts are used, the amount of catalyst used is in the range of from 0.1 to 10% by weight, preferably from 0.2 to 2% by weight.

Enzymes or decomposition products of enzymes are not included among the acidic organic catalysts for the purposes of the present invention. Similarly the dicarboxylic acids reacted in accordance with the invention are not among the acidic organic catalysts for the purposes of the present invention.

For conducting the process, it is advantageous to forego the use of enzymes.

The process of preparing the high-functionality hyperbranched polyesters is carried out under an inert gas atmosphere, wherein the inert gas is selected from the group consisting of carbon dioxide, nitrogen, noble gas, in particular argon, and mixtures of two or more of these inert gases.

The process of preparing the high-functionality hyperbranched polyesters is conducted at temperatures in the range of from 80 to 200° C. It is preferred to operate at temperatures in the range of from 130 to 180° C.

The pressure conditions of preparing the high-functionality hyperbranched polyesters are not critical per se. It is possible to operate at a considerably reduced pressure, for example, in the range of from 10 to 500 mbar. The process can also be conducted at pressures above 500 mbar. For reasons of simplicity it is preferred to carry out the reaction at atmospheric pressure, although it can also be carried out at a slightly elevated pressure, up to 1200 mbar, for example. Working under a significantly increased pressure is a further possibility, at pressures up to 10 bar, for example. Reaction at 300 mbar up to atmospheric pressure is preferred.

The reaction time is usually in the range of from 10 minutes to 25 hours, preferably from 30 minutes to 10 hours and more preferably from one to 8 hours.

After the end of the reaction the high-functionality hyperbranched polyesters can be isolated easily, for example, by removing the catalyst by filtration and concentrating the filtrate, usually under reduced pressure. Further highly suitable workup methods include precipitation following the addition of water and subsequent washing and drying.

Polyethers

Polyethers having at least one, preferably at least two, functional groups which are reactive towards isocyanate groups are preferably selected from the group of high-functionality polyetherpolyols (polyetherols).

High-functionality polyetherols are obtainable from reacting at least one tri- or higher functional alcohol and optionally further di- and/or monofunctional alcohols with the aid of acidic catalysts.

In the context of this invention, a high-functionality polyetherol means a product which, as well as the ether groups which form the polymer skeleton, has at least three, preferably at least six and more preferably at least ten OH groups in pendant or terminal positions. The polymer skeleton may be linear or branched. There are in principle no upper limits to the number of terminal or pendant functional groups, but products with a very high number of functional groups may have undesired properties, for example high viscosity or poor solubility. The high-functionality polyetherols used according to the present invention thus preferably have not more than 500 terminal or pendant functional groups, more preferred not more than 100 terminal or pendant functional OH groups.

In some embodiments, the high-functionality polyetherols are hyperbranched polyetherols. In the context of this invention, hyperbranched polyetherpolyols mean uncrosslinked polymer molecules with hydroxyl and ether groups which are both structurally and molecularly inhomogeneous. On the one hand, they may have a structure analogous to dendrimers proceeding from a central molecule, but with inhomogeneous chain length of the branches. On the other hand, they may also have linear regions with functional side groups. For a definition of dendrimeric and hyperbranched polymers, see also P. J. Flory, J. Am. Chem. Soc. 1952, 74, 2718 and H. Frey et al., Chem. Eur. J. 2000, 6, No. 14, 2499. In the context of the present invention, "hyperbranched" is understood to mean that the degree of branching (DB), i.e. the mean number of dendritic bonds plus the mean number of end groups per molecule, divided by the sum of the mean number of dendritic, linear and terminal bonds, multiplied by 100, is from 10 to 99.9%, preferably from 20 to 99% and more preferably 20 95%. In the context of the present invention, “dendrimeric” is understood to mean that the degree of branching is 99.9-100%. For a definition of the degree of branching see H. Frey et al., Acta Polym. 1997, 48, 30.

The high-functionality polyetherol is preferably the condensation product of one or more tri- or higher functional alcohols, optional one or more diols, and optionally one or more monools. The tri- or higher functional alcohols have preferably from 3 to 6 hydroxyl groups. Triols are preferably selected from the group consisting of trimethylolmethane, trimethylolethane, trimethylolpropane (TMP), 1,2,4-butanetriol, tris(hydroxymethyl) isocyanurate, tris(hydroxyethyl) isocyanurate (THEIC), tris(hydroxy-isopropyl) isocyanurate, triethanol amine, triisopropanol amine and mixtures of two or more thereof. Tetrols are preferably selected from the group consisting of bistrimethylolpropane (di-TMP), pentaerythritol and mixtures of two or more thereof. Higher-functionality polyols having 4 to 6 hydroxyl groups are preferably selected from the group consisting of bispentaerythritol (di-penta), inositols, and mixtures of two or more thereof. In addition, it is also possible to use alkoxylation products of the aforementioned alcohols and of glycerol, preferably with 1-40 alkylene oxide units per molecule. Particular preference is given to using, as the tri- or higher functional alcohols, aliphatic alcohols and especially those with primary hydroxyl groups, preferably selected from the group consisting of trimethylolmethane, trimethylolethane, trimethylolpropane, di-TMP, pentaerythritol, di-penta and alkoxylates thereof having 1-30 ethylene oxide units per molecule, and also glyceryl ethoxylates having 1-30 ethylene oxide units per molecule, as well as mixtures of two or more thereof. Preferably, compounds which bear OH groups on two immediately adjacent carbon atoms are excluded as tri- and higher functional alcohols. These compounds tend to elimination reactions which may be preferred over the etherification reaction. The tri- and higher functional alcohols can also be used in a mixture with one or more difunctional alcohols. A difunctional alcohol having two OH groups is preferably selected from the group consisting of ethylene glycol, diethylene glycol, triethylene glycol, 1,2- and 1,3-propanediol, dipropylene glycol, tripropylene glycol, neopentyl glycol, 1,2-, 1,3-butanediol, 1,4-butanediol, 1,2-pentanediol, 1,3-pentanediol, 1,5-pentanediol, hexanediol, dodecanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, isosorbitol, difunctional polyetherpolyols based on ethylene oxide, propylene oxide, butylene oxide or mixtures thereof, polytetrahydrofuran and mixtures of two or more thereof. The one or more diols serve for fine adjustment of the properties of the polyetherpolyol. If difunctional alcohols are used, the ratio of difunctional alcohols to the tri- and higher functional alcohols is fixed by the person skilled in the art according to the desired properties of the polyether. In general, the amount of the difunctional alcohol(s) is from 0 to 99 mol %, preferably 0-80 mol %, more preferably 0-75 mol % and most preferably 0-50 mol % based on the total amount of all alcohols. By virtue of addition of tri- and higher functional alcohols and diols varying in the course of the reaction, it is also possible to obtain block copolyethers, for example diol-terminated polyethers. It is also possible to precondense difunctional alcohols to OH-terminated oligomers and then to add the trifunctional or higher-functionality alcohol. In this way, it is likewise possible to obtain hyperbranched polymers with linear block structures. Moreover, it is also possible to add one or more monools to control the OH functionality during or after the conversion of the tri- and higher functional alcohols. Such monools may, for example, be linear or branched-chain, aliphatic or aromatic monools. They preferably have more than 3 and more preferably more than 6 carbon atoms. Also suitable as monools are monofunctional polyetherols. Preferably not more than 50 mol % of monool, based on the total amount of the trifunctional and higher-functionality alcohol, is added.

To accelerate the reaction, acidic catalysts or catalyst mixtures are added. Suitable catalysts are, for example, acids with a pKa of less than 2.2; particular preference is given to strong acids. Examples of acids with a pKa of less than 2.2 are, for example, phosphoric acid ($H_3PO_4$), phosphorous acid ($H_3PO_3$), pyrophosphoric acid ($H_4P_2O_7$), polyphosphoric acid, phosphinic acid ($H_3PO_2$), hydrogensulfate ($HSO_4$—), sulfuric acid ($H_2SO_4$), perchloric acid, hydrochloric acid, hydrobromic acid, chlorosulfonic acid, methanesulfonic acid, trichloromethanesulfonic acid, trifluoromethanesulfonic acid, benzenesulfonic acid or p-toluenesulfonic acid. Further examples of inventive acidic catalysts are acidic ion exchangers or ion exchange resins. “Ion exchangers” is the collective term for solid substances or liquids which are able to absorb positively or negatively charged ions from an electrolyte solution while releasing equivalent amounts of other ions. Preference is given to using solid grains and particles whose matrix has been obtained by condensation (phenol-formaldehyde) or by polymerization (copolymers of styrene and divinylbenzene, and methacrylates and divinylbenzene). The acidic ion exchangers used in accordance with the invention bear, for example, sulfonic acid groups, carboxylic acid groups or phosphonic acid groups. It is also possible to use ion exchangers which possess a hydrophilic cellulose structure or consist of crosslinked dextran or agarose, and bear acidic functional groups, for example carboxymethyl or sulfoethyl groups. It is also possible to use inorganic ion exchangers, such as zeolites, montmorillonites, palygorskites, bentonites and other aluminum silicates, zirconium phosphate, titanium tungstate and nickel hexacyanoferrate(II). For ion exchangers, see also ROM PP, Chemisches Lexikon [Chemical Lexicon], Online Version 3.0, or “Ion Exchangers” by F. De Dardel and T. V. Arden, published in Ullmann's Encyclopedia of Industrial Chemistry, Electronic Release 2007. Acidic ion exchangers are obtainable, for example, in solid or dissolved form under the product names AmberliterM, Ambersept™ or Amberjet™ from Rohm and Haas. Particular preference is given, as catalysts, to phosphoric acid, polyphosphoric acid, chlorosulfonic acid, methanesulfonic acid, trichloromethanesulfonic acid, trifluoromethanesulfonic acid, benzenesulfonic acid, p-toluenesulfonic acid or acidic ion exchangers. The acid is added as a catalyst generally in an amount of from 50 ppm to 10% by weight, preferably from 100 ppm to 5% by weight and more preferably from 1000 ppm to 3% by weight, based on the amount of the alcohol or alcohol mixture used. When an acidic ion exchanger is used as a catalyst, an amount of from 1000 ppm to 30% by weight, preferably of 1-25% by weight, more preferably 1-20% by weight, based on the amount of the alcohol or alcohol mixture used, is typically added. It will be appreciated that the catalysts can also be used in a mixture.

Polycarbonates

Polycarbonates having at least one, preferably at least two, functional groups which are reactive towards isocyanate groups are preferably selected from the group of hyperbranched polycarbonates, more preferred high-functionality hyperbranched polycarbonates as disclosed in WO 2005/026234 A1.

Within the scope of this invention, hyperbranched polycarbonates are non-crossliked macromolecules with hydroxyl, carbonate- or carbamoyl chloride groups that are heterogeneous with regard to their structure. In the context of this invention, hyperbranched polycarbonatols mean uncrosslinked polymer molecules with hydroxyl and carbonate groups which are both structurally and molecularly inhomogeneous. On the one hand, they may have a structure analogous to dendrimers proceeding from a central molecule, but with inhomogeneous chain lengths of the branches. On the other hand, they may also have linear regions with functional side groups. For a definition of dendrimeric and hyperbranched polymers, see also P. J. Flory, J. Am. Chem. Soc. 1952, 74, 2718 and H. Frey et al., Chem. Eur. J. 2000, 6, No. 14, 2499. In the context of the present invention, “hyperbranched” is understood to mean that the degree of branching (DB), i.e. the mean number of dendritic bonds plus the mean number of end groups per molecule, divided by the sum of the mean number of dendritic, linear and terminal bonds, multiplied by 100, is from 10 to 99.9%, preferably from 20 to 99% and more preferably 20 to 95%. In the context of the present invention, “dendrimeric” is understood to mean that the degree of branching is 99.9-100%. For a definition of the degree of branching see H. Frey et al., Acta Polym. 1997, 48, 30.

Polycarbonates are obtained or obtainable from reacting a carbonate-component (A) and an alcohol-component (B).

Polycarbonates—Carbonate Component (A)

The carbonate component is preferably selected from phosgene, diphosgene, triphosgene, organic carbonates and mixtures of two or more thereof. Organic carbonates of the formula $R'O[(CO)O]_tR'$ are preferably used, wherein t is an integer from the range of from 1-5, preferred from the range of from 1-3, more preferred t=1. The groups R' are chosen independently from each other from the group consisting of linear aliphatic hydrocarbon, branched aliphatic hydrocarbon, aromatic/aliphatic hydrocarbon and aromatic hydrocarbon with 1-20 C-atoms. Both R'-groups are separate or connected, forming a ring. Preferred, each R' is an aliphatic hydrocarbon-chain, more preferred a branched or unbranched alkyl chain with 1-5 C-atoms or a substituted or unsubstituted phenyl group.

Preferably, the carbonate is selected from the group consisting of aliphatic carbonate, aromatic/aliphatic carbonat and aromatic carbonate, more preferred from the group consisting of ethylene carbonate, 1,2 propylene carbonate, 1,3-propylene carbonate, diphenyl carbonate, ditoluenyl carbonate, dixylenyl carbonate, dinapththyl carbonate, ethylphenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, dodecyl carbonate, didodeyl carbonate and mixtures of two or more of these carbonates.

Preferred carbonates with n>1 are selected from the group consisting of dialkyldicarbonate, preferably di(tert butyl) dicarbonate, dialkyl tricarbonate, preferably di(tert butyl) tricarbonate and mixtures of dialkyldicarbonate and dialkyl tricarbonate.

Prefered, aliphatic carbonates are employed, especially with R with 1-5 C-atoms, more preferred selected from the group consisting of dimethyl carbonate, diethyl carbonate, dipropyl carbonate, dibutyl carbonate, diisobutyl carbonate, and mixtures of two or more thereof.

The organic carbonates are reacted with at least one aliphatic or aromatic alcohol (B) with at least 3 OH-functions or a mixture of several alcohols.

Polycarbonates—Alcohol Component (B)

The alcohol component (B) has at least 3 OH groups and is preferably selected from the group consisting of glycerol, trimethylol methane, trimethylol ethane, trimethylol propane, 1,2,4-butanetriol, tris(hydroxymethyl)amine, tris(hydroxypropyl)amine, tris(hydroxymethyl)isocyanurate, tris (hydroxyethyl)isocyanurate, tris(hydroxy-isopropyl) isocyanurate, phloroglucinol, trihydroxy toluene, trihydroxy dimethylbenzene, phloroglucide, hexyhydroxy benzene, 1,3,4-benzene trimethanol, 1,1,1-tris(4'hydroxyphenyl)methane, 1,1,1-tris(4'hydroxyphenyl)ethan, sugars, preferably glucose, sogar derivatives, preferably selected from the group consisting of tri- or higher functional polyetherols on the base of tri- or higher functional alcohols and ethylene oxide, propylene oxide, buylene oxide or their mixtures, and polyesterols as defined above. More preferred, the alcohol component (B) is selected from the group consisting of glycerol, trimethylolethane, trimethylolpropane, 1,2,4-butane triol, pentaeryhtrit, polyetherols based on ethylene oxide and propylene oxide, and mixtures of two or more of these alcohol components.

The alcohol component (B) having at least 3 OH groups can also be employed as mixture with difunctional alcohols (B'). The difunctional alcohols (B') is preferably selected from the group consisting of ethylene glycol, diethylene glyol, triethylenglycol, 1,2- and 1,3-propane diol, dipropylene glycol, tripropylene glycol, neopentyl glycol, 1,2-butane diol, 1,3-butane diol, 1,4-butane diol, 1,2-pentane diol, 1,3-pentane diol, 1,5-pentane diol, hexane diol, cyclopentane diol, cyclohexane diol, cyclohexane dimethanol, bis(4-hydroxycyclohexyl)methane, bis(4-hydroxycyclohexyl)ethane, 2,2-bis(4-hydroxycyclohexyl)propane, 1,1'-bis(4-hydroxyphenyl)- 3,3,5-trimethylcyclohexane, resorcin, hydroquinone, 4,4'dihydroxydiphenyl, bis-(4-hydroxyphenyl)sulfide, bis(4-hydroxyphenyl)methane, bis(p-hydroxyphenyl)ethane, 2,2-bis(p-hydroxyphenyl)propane, 1,1-bis(p-hydroxyphenyl)cyclohexane, dihydroxy benzophenone, difunctional polyetherols based on ethylene oxide, propylene oxide, butylene oxide or their mixtures, polytetrahydrofurane, polycaprolactone and polyesterols based on diols and dicarboxylic acids.

The difunctional alcohols (B') are used to fine-tune the properties of the polycarbonate. If difunctional alcohols (B') are used, the relation of difunctional alcohol (B') to at least trifunctional alcohol (B) is determined by the person skilled in the art. Preferably, the amount of B' is in the range of from 0-39.9 mol %, more preferred in the range of from 0-35% mol, more preferred in the range of from 0-25% mol, more preferred in the range of from 0-10% mol, with respect to the sum of B and B'.

The reaction of phosgene, diphosgene, triphosgene with the alcohol or alcohol mixture is accompanied by the elimination of hydrogen chloride, the reaction of carbonates with the alcohol or alcohol mixture to give the high functionality polycarbonate is accompanied by the elimination of the monofunctional alcohol or phenol from the carbonate molecule.

The polycarbonates can be dissolved in one or more solvents, preferably selected from the group consisting of acetone, 2-butanone, ethyl acetate, butyl acetate, tetrahydrofurane, dimethylformamide, dimethyl acetamide, N-methyl pyrrolidone, ethylene carbonate, propylene carbonate, and mixtures of two or more of these solvents.

A high functionality polycarbonate is a product with, besides the carbonate groups that comprise the backbone, at least 3, preferred at least 6, more preferred at least 10 pending functional groups. The functional groups are carbonates and/or OH-groups. Their number has, in principle, no upper limit. However, products with very high amounts of functional groups can have undesired properties such as high viscosity or low solubility. In the present invention, usually not more than 500 functional groups, preferred not more then 100, are present. Preferably, a high functionality polycarbonate has in the range of from 3 to 500, more preferred in the range of from 6 to 100, more preferred in the range of from 10 to 100, functional groups.

In the production of high functionality polycarbonates it is necessary to adjust the ratio of OH-groups to phosgene or carbonate. It is usually between 6:1 and 1:1, preferred between 4:1 and 1:1, more preferred between 3:1 and 1:1.

The reaction towards the condensation product preferably proceeds at temperature in the range of from 0-300° C., preferred in the range of from 0-250° C., more preferred in the range of from 60-200° C., more preferred in the range of from 60-160° C. in substance or solution. Generally, all solvents can be employed that are inert towards the reaction products. Preferred are organic solvents like decane, dodecane, benzene, toluene, chlorobenzene, xylene, dimethyl formamide, dimethyl acetamide, solvent naphta.

It is preferred to perform the polycondensation reaction without solvent. The liberated mono-alcohol or phenol can be removed from the reaction to increase the reaction rate by distillation, possibly under reduced pressure.

To increase reaction rates, catalysts or catalyst mixtures can be employed. Preferably, a catalyst is selected from the group consisting of alkaline hydroxide, alkaline carbonate, alkaline biscarbonate, and mixtures of two or more thereof, more preferred from the group consisting of sodium biscarbonate, potassium biscarbonate, cesium biscarbonate, tertiary amine, guanidine, ammonium compound, phosphonium compound, aluminum-, zinc-, tin-, titanium-, zirconium-, bismuth-organic compound, so called double-metal cyanide (DMC)-catalyst as in DE 10138216 or DE 10147712, and mixtures of two or more thereof.

Preferably, a catalyst is selected from the group consisting of potassium hydroxide, potassium carbonate, potassium biscarbonate, diazabicyclooctane (DABCO), diazabicyclononen (DBN), bisazabicycloundecen (DBU), imidazole-derivatives, preferably selected from imidazole, 1-methyl imidazole, and 1,2-dimethylimidazole, titanium tetrabutylate, titanium tetraisopropylate, dibutyl tin oxide, dibutyltin dilaureate, tin dioctoate, zirconium acetylacetonate and mixtures thereof.

The catalyst is usually added in amounts of 50-10000, preferred 100-5000 ppm by weight with respect to the amount of used alcohol or alcohol mixture.

Polyacrylates

Linear or branched polyols created from copolymers of different acrylate-, methacrylate monomers and styrene will be referred to as "polyacrylates" or "polyacrylatols" within this invention.

Linear polymers can be prepared by persons skilled in the art with acrylate, methacrylate and styrene backbones or mixtures thereof. They typically have in the range of from 2 to 10 OH-groups per molecule, a hydroxy-number in the range of from 50-170 mg KOH/g, a molecular weight, determined by a person skilled in the art with a GPC calibrated to polystyrene fitted with a suitable solvent and column, Mn in the range of from 1000-10000 and a polydispersity of below 10.

monomers are preferably selected from the group consisting of styrene, alpha-methyl styrene, methyl methacrylate, methyl acrylate, butyl methacrylate, butyl acrylate, isobornyl methacrylate, isobornyl acrylate, 2-ethylhexyl methacrylate, 2-ethylhexyl methacrylate, hydroxyethyl methacrylate, hydroxyethyl acrylate, methacrylic acid, acrylic acid and mixtures of two or more thereof.

Branching can be preferably introduced by ethylene dimethacrylate, ethylene diacrylate, di-, tri- or oligo acrylates or methacrylates of alkoxylated (usually 1-10 alkylene oxide units chosen from ethylene oxide, propylene oxide, butylene oxide or mixtures thereof) or non-alkoxylated diol or triol monomers, for example, from trimethylolmethane, trimethylolethane, trimethylolpropane (TMP), 1,2,4-butanetriol, tris(hydroxymethyl) isocyanurate, tris(hydroxyethyl) isocyanurate (THEIC), tris(hydroxy-isopropyl) isocyanurate, triethanol amine, triisopropanol amine and mixtures of two or more thereof, bistrimethylolpropane (di-TMP), pentaerythritol, bispentaerythritol (di-penta), inositols, 1,2- and 1,3-propanediol, dipropylene glycol, tripropylene glycol, neopentyl glycol, 1,2-, 1,3-butanediol, 1,4-butanediol, 1,2-pentanediol, 1,3-pentanediol, 1,5-pentanediol, hexanediol, dodecanediol, cyclopentanediol, cyclohexanediol, cyclohexanedimethanol, bis(4-hydroxycyclohexyl)methane, bis (4-hydroxycyclohexyl)ethane, 2,2-bis(4-hydroxycyclohexyl)propane, isosorbitol, difunctional polyetherpolyols based on ethylene oxide, propylene oxide, butylene oxide or mixtures thereof, polytetrahydrofuran and mixtures of two or more thereof.

The polymers can be applied for the reaction with uretdiones neat or in solution. Preferred solvents are selected from the group consisting of acetone, toluene, xylene, tert butyl acetate, methyl ethyl ketone, and mixtures of two or more thereof.

Additives

Reacting the polymer having at least one functional group reactive towards isocyanate groups of (i) with the uretdione of formula (II) of (ii) according to step (iii) is done in the presence of a catalyst composition comprising at least one catalyst C; thereby obtaining a polymer having at least one, preferably at least two, functional groups R.

In step (iii) one or more additives are optionally present. These optional additives are selected from the group consisting of colorant, polymeric binder, fillers, waxes, fatty acid amides, plasticizers, dispersing assitants, adhesion promoters and mixtures of two or more of these additives. Colorants which can be used are the customary dyes, in particular customary pigments. Examples are inorganic pigments such as titanium dioxide pigments or iron oxide pigments, interference pigments, carbon blacks, metal powders such as particularly aluminum, brass or copper powder, and also organic pigments such as azo, phthalocyanine or isoindoline pigments. As will be appreciated, it is also possible to use mixtures of different dyes or colorants and also soluble organic dyes. It is usual to use from 5 to 25% by weight of colorant, relative to the sum of all the constituents. Fillers are, for example, calcium carbonate, aluminum oxide hydrate or aluminum silicate or magnesium silicate. Waxes increase the abrasion resistance and serve to enhance the lubricity. Particular examples are polyethylene waxes, oxidized polyethylene waxes, petroleum waxes or ceresin waxes. Fatty acid amides can be used to raise the surface smoothness. Plasticizers increase the elasticity of the dried film. Examples are phthalic esters such as dibutyl phthalate, diisobutyl phthalate, dioctyl phthalate, citric esters or esters of adipic acid. Dispersing assistants can be used to disperse the pigments.

4th Aspect—Modified Polymer

In a fourth aspect, the invention relates to a modified polymer obtained or obtainable according to the method of the third aspect.

5th Aspect—Uretdione of Formula (II)

A fifth aspect of the invention relates to n uretdione of formula (II) as defined with respect to the method of the third aspect.

The present invention is further illustrated by the following set of embodiments and combinations of embodiments resulting from the dependencies and back-references as indicated. In particular, it is noted that in each instance where a range of embodiments is mentioned, for example in the context of a term such as "any one of embodiments (1) to (4)", every embodiment in this range is meant to be explicitly disclosed for the skilled person, i.e. the wording of this term is to be understood by the skilled person as being synonymous to "any one of embodiments (1), (2), (3), and (4)". Further, it is explicitly noted that the following set of embodiments does not determine the extent of protection, but represents a suitably structured part of the description directed to general and preferred aspects of the present invention.

According to an embodiment (1), the present invention relates to a process for preparing a polymer comprising a structural element —N—C(═O)—$X^2$—, wherein the process comprises b) Providing an uretdione of formula (I)

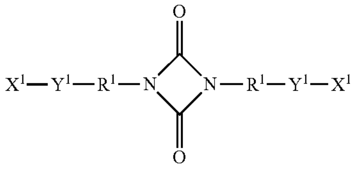

(I)

wherein $R^1$ is selected from:

branched and unbranched C1 to C20-alkylene group;

substituted or unsubstituted C4 to C20-cycloalkyl group, wherein a substituted C4 to C20-cycloalkyl group has one or more substituents independently selected from branched or unbranched C1 to C8-alkyl group, wherein each C4 to C20-cycloalkyl group is either directly bonded to $Y^1$ or is bonded via a $CH_2$ group to $Y^1$ and is either directly bonded to the nitrogen atom of the uretdione structure or via a $CH_2$ group;

C1 to C5 alkyl-bridged dicyclohexyl group;

Substituted or unsubstituted C6 to C14-aryl group, wherein a substituted C6 to C14-aryl group has one or more substituents independently selected from branched or unbranched C1 to C8-alkyl group;

C1 to C5-alkyl-bridged di-C6 to C14-aryl group, wherein each C6 to C14-aryl group is unsubstituted or substituted with one or more substituents independently from branched or unbranched C1 to C8-alkyl group;

$X^1$ is a group reactive towards isocyanantes, preferably $X^1$ is selected from the group consisting of OH group, $NH_2$ group, and $NR^3H$ $Y^1$ is a linker group, wherein $Y^1$ is absent or selected from the group consisting of —NH—C(═O)—[$R^2$—]—, —NH—C(═O)—O—$[CH_2]_n$—, —NH—C(═O)—O—$[R^1]_n$—, each with the nitrogen-atom being attached to $R^1$, —$[CH_2]_n$—, —[$R^2$]—, —NH—C(═O)—NH—$[R^1]_n$—, —$[R^1]_n$—, —NH—C(═O)—NH-cyclohexyl-, which has at least one $CH_3$ group on the cyclohexyl ring, —NH-cyclohexyl-, which has at least one $CH_3$ group on the cyclohexyl ring, —NH—C(═O)—$NR^3$—[$R^1$]—, —[$R^1$]—, —NH—C(═O)—$NR^3$-cyclohexyl which has at least one $CH_3$ group on the cyclohexyl ring, —$NR^3$-cyclohexyl-, which has at least one $CH_3$ group on the cyclohexyl ring, and $R^1$;

wherein $R^1$ is as defined above, $R^2$ is a polyetherpolyol residue having on each side a terminal oxygen atom based on ethylene oxide, propylene oxide, butylene oxide or mixtures thereof, with 1-100 repeating units, preferred 1-60 repeating units, more preferred 1-30 repeating units, more preferred 1-15 repeating units or —$[(CH_2)_4—O]_r$— with r being an integer in the range of from 1-100, preferred in the range of from 1-60, more preferred in the range of from 1-30, more preferred in the range of from 1-15; and mixtures of polyetherpolyol residues having on each side a terminal oxygen atom based on ethylene oxide, propylene oxide, butylene oxide or mixtures thereof with p repeating units and —$[(CH_2)_4—O]_r$, wherein the sum of p and r is an integer in the range of from 1-100, preferred in the range of from 1-60, more preferred in the range of from 1-30, more preferred in the range of from 1-15, $R^3$ is selected from the group consisting of methyl group, ethyl group, propyl group, isopropyl group, butyl group, iso-butyl group, ethyl hexyl group and benzyl group; and n is zero or an integer in the range of from 1 to 12;

b) ring opening of the uretdione of formula (I) provided according to (a)

at a temperature of more than 50° C., in the presence of a catalyst composition comprising at least one catalyst C, thereby obtaining a polymer comprising a structural element —N—C(═O)—$X^2$, wherein $X^2$ is a derivative of the group $X^1$ reactive towards isocyanates, preferably $X^2$ is selected from the group consisting of oxygen atom (—O—), —NH— group, and —$NR^3$—, wherein $R^3$ is as defined above.

A preferred embodiment (2) concretizing embodiment (1) relates to said process, wherein in the uretdione of formula (I) according to (a) $X^1$ is a hydroxyl group and $Y^1$ is selected from the group consisting of —NH—C(═O)—[$R^2$]—, —NH—C(═O)—O—[$CH_2$]$_n$—, —NH—C(═O)—O—[$R^1$]$_n$—, —[$CH_2$]$_n$—, and [$R^2$]—, wherein n, $R^1$ and $R^2$ are as defined in embodiment 1.

A further preferred embodiment (3) concretizing embodiment (1) relates to said process, wherein in the uretdione of formula (I) according to (a) $X^1$ is a $NH_2$ group and $Y^1$ is selected from the group consisting of —NH—C(═O)—NH—[$R^1$]$_n$—, —[$R^1$]$_n$—, —NH—C(═O)—NH-cyclohexyl-, which has at least one $CH_3$ group on the cyclohexyl ring, and —NH-cyclohexyl, which has at least one $CH_3$ group on the cyclohexyl ring, wherein n and $R^1$ are as defined in embodiment 1.

A further preferred embodiment (4) concretizing embodiment (1) relates to said process, wherein in the uretdione of formula (I) according to (a) $X^1$ is a $NHR^3$ group and $Y^1$ is selected from the group consisting of NH—C(═O)—$NR^3$—[$R^1$]$_n$—, [$R^1$]$_n$—, —NH—C(═O)—$NR^3$-cyclohexyl NH—C(═O)—$NR^3$-cyclohexyl which has at least one $CH_3$ group on the cyclohexyl ring, and —$NR^3$-cyclohexyl-, which has at least one $CH_3$ group on the cyclohexyl ring, wherein n, $R^1$ and $R^3$ are as defined in embodiment 1.

A further preferred embodiment (5) concretizing any one of embodiments (1) to (4), relates to said process, wherein in the uretdione of formula (I) according to (a) $R^1$ is selected from the group consisting of —[$CH_2$]$_m$-group with m being an integer in the range of from 3 to 20, preferably in the range of from 5 to 7, phenylene group (1,2-phenylene group, 1,3-phenylene group, or 1,4-phenylene group), optionally substituted with one or more substituents selected from methyl group, cyclohexylene and $CH_2$-cyclohexylene group, wherein the cyclohexylene ring is optionally substituted with one or more substituents selected from methyl group, and —$CH_2$-bridged di-C6-aryl group; preferably from the group consisting of

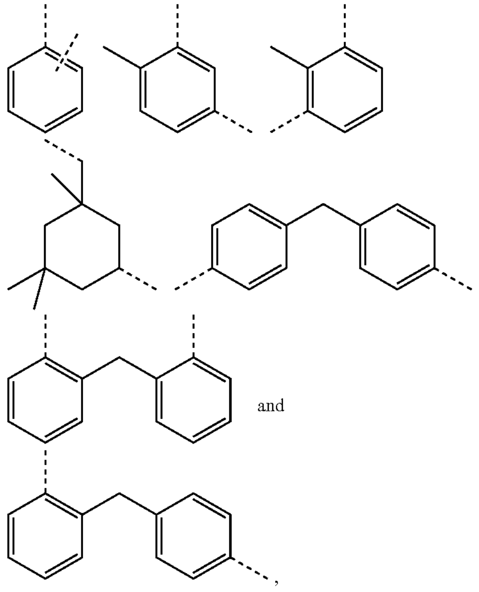

and

, wherein the dotted lines represent the bonds towards $Y^1$ and towards the nitrogen atom of the central uretdione structure.

A further preferred embodiment (6) concretizing any one of embodiments (1) to (5), relates to said process, wherein step (b) is conducted at a pressure in the range of from 500 to 2000 mbar, preferably at a pressure in the range of from 800 to 1500 mbar, more preferred at a pressure in the range of from 900 to 1200 mbar, more preferred at a pressure in the range of from 950 to 1100 mbar.

A further preferred embodiment (7) concretizing any one of embodiments (1) to (6), relates to said process, wherein step (b) is conducted in an atmosphere comprising more than 5 volume-%, preferably more than 10 volume-%, more preferred more than 15 volume-%, more preferred more than 20 volume-%, of oxygen, based on the total composition of the atmosphere, more preferred in ambient atmosphere (i.e. under air) or wherein step (b) is conducted in a protective atmosphere, more preferably an inert gas atmosphere, wherein the inert gas is preferably selected from the group consisting of helium, neon, argon, krypton, xenon, nitrogen and mixtures of two or more of these inert gases.

A further preferred embodiment (8) concretizing any one of embodiments (1) to (7), relates to said process, wherein step (b) is conducted at a temperature in the range of from 50 to 300° C.

A further preferred embodiment (9) concretizing any one of embodiments (1) to (8), relates to said process, wherein step (b) is conducted for a period of time of more than 5 minutes, preferably of more than 30 minutes, more preferred more than 1 hour.

A further preferred embodiment (10) concretizing any one of embodiments (1) to (9), relates to said process, wherein step (b) is conducted for a period of time of less than 72 hours, preferably less than 48 hours, more preferred less than 24 hours.

A further preferred embodiment (11) concretizing any one of embodiments (1) to (10), relates to said process, wherein step (b) is conducted for a period of time in the range of from 5 minutes to 72 hours, preferably in the range of from 30 minutes to 48 hours, more preferred in the range of from 1 to 24 hour(s).

A further preferred embodiment (12) concretizing any one of embodiments (1) to (11), relates to said process, wherein the at least one catalyst C comprised in the catalytic composition according to step (b) comprises at least one ionic liquid, preferably selected from the group consisting of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethylimidazolium bromide (EDMIM-Br), 1-(2-hydroxyethyl)-3-methyl imidazolium chloride (HEMIM-Cl), butyl-1-methylpiperidinium acetate (BMPM acetate), and mixtures of two or more thereof, wherein the at least one catalyst C comprises preferably at least BMPM-Cl.

A further preferred embodiment (13) concretizing embodiment (12) relates to said process, wherein the ionic liquid is combined with one or more co-catalyst, wherein the co-catalyst is selected from the group consisting of organometallic catalyst, tertiary amine catalyst and mixtures of organometallic catalyst and tertiary amine catalyst.

An embodiment (14) of the present invention relates to a polymer comprising a structural element —N—C(═O)—$X^2$— obtained or obtainable from the process according to any one of embodiments (1) to (12).

An embodiment (15) of the present invention relates to a method for modifying polymers, which have reactive groups towards isocyanate groups, the method comprising:

i) providing a polymer having at least one, preferably at least two, functional groups which are reactive towards isocyanate groups;

ii) providing an uretdione of formula (II)

(II)

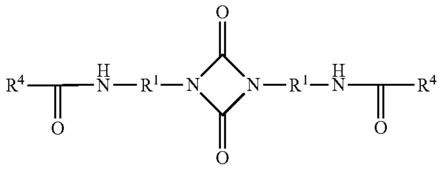

wherein $R^4$ is a $Y^2$—$R^5$ group, wherein $Y^2$ is a single oxygen atom —O— or $Y^2$ is —$NR^3$— with $R^3$ being selected from the groups consisting of hydrogen atom, methyl group, ethyl group, propyl group, isopropyl group, butyl group, iso-butyl group, ethyl hexyl group and benzyl group;

and $R^5$ is selected from branched and unbranched C1 to C20-alkylene group;

substituted or unsubstituted C3 to C20-cycloalkyl group, wherein a substituted C3 to C20-cycloalkyl group has one or more substituents independently selected from branched or unbranched C1 to C8-alkyl group, wherein each C3 to C20-cycloalkyl group is either directly bonded to $Y^2$ or is bonded via a $CH_2$ group to $Y^2$;

Substituted or unsubstituted C6 to C14-aryl group, wherein a substituted C6 to C14-aryl group has one or more substituents independently selected from branched or unbranched C1 to C8-alkyl group;

C1 to C5-alkyl-bridged di-C6 to C14-aryl group, wherein each C6 to C14-aryl group is unsubstituted or substituted with one or more substituents independently from branched or unbranched C1 to C8-alkyl group; and isobornyl, bornyl, and menthyl;

or $R^4$ is selected from:

acrylate or methacrylate, esterification products of diol with acrylic acid and/or methacrylic acid; wherein the diol is selected from the group consisting of ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, cyclohexane dimethanols, isosorbitol, hydroxypivalinic acid neopentylglycol ester, inositol, inositol derivatives, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, difunctional polyetherpolyols based on ethylene oxide, propylene oxide, butylene oxide or mixtures thereof, with 1-100 repeating units, preferred 1-60 repeating units, more preferred 1-30 repeating units, more preferred 1-15 repeating units;

ersterification products of polytetrahydrofuran with acrylic acid and/or methacrylic acid with 1-100 repeating units, preferred 1-60 repeating units, more preferred 1-30 repeating units, more preferred 1-15 repeating units;

esterification products of acrylic acid and/or methacrylic acid with at least one polyol having three or more hydroxyl groups; and mixtures of two or more of these compounds;

$R^1$ is selected from:

branched and unbranched C1 to C20-alkylene group;

substituted or unsubstituted C4 to C20-cycloalkyl group, wherein a substituted C4 to C20-cycloalkyl group has one or more substituents independently selected from branched or unbranched C1 to C8-alkyl group, wherein each C4 to C20-cycloalkyl group is either directly bonded to the nitrogen atom of the —NH— unit or is bonded via a $CH_2$ group toe nitrogen atom of the —NH— unit and is either directly bonded to the nitrogen atom of the uretdione structure or via a $CH_2$ group;

C1 to C5 alkyl-bridged dicyclohexyl group;

Substituted or unsubstituted C6 to C14-aryl group, wherein a substituted C6 to C14-aryl group has one or more substituents independently selected from branched or unbranched C1 to C8-alkyl group;

C1 to C5-alkyl-bridged di-C6 to C14-aryl group, wherein each C6 to C14-aryl group is unsubstituted or substituted with one or more substituents independently from branched or unbranched C1 to C8-alkyl group;

iii) Reacting the polymer having at least one functional group reactive towards isocyanate groups of (i) with the uretdione of formula (II) of (ii)

at a temperature of more than 50° C., in the presence of a catalyst composition comprising at least one catalyst C.

A preferred embodiment (16) concretizing embodiment (15) relates to said method, wherein in the uretdione of formula (II) according to (ii) $R^1$ is selected from the group consisting of an unbranched C3 to C20-alkylene group —$[CH_2]_m$-group with m being an integer in the range of from 3 to 20, preferably in the range of from 5 to 7, phenylene group (1,2-phenylene group, 1,3-phenylene group, or 1,4-phenylene group), optionally substituted with one or more substituents selected from methyl group, cyclohexylene and —$CH_2$-cyclohexylene group, wherein the cyclohexylene ring is optionally substituted with one or more substituents selected from methyl group, and —$CH_2$-bridged di-C6-aryl group; preferably from the group consisting of

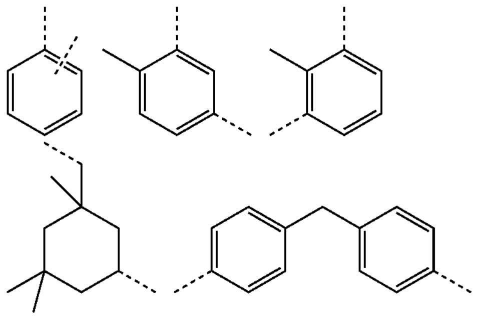

-continued

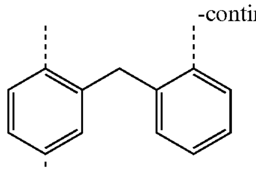

and

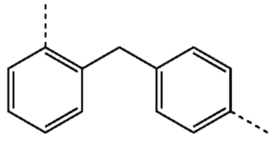

, wherein the dotted lines represent the bonds towards the nitrogen atom of the —NH— unit and towards the nitrogen atom of the central uretdione structure.

A further preferred embodiment (17) concretizing embodiment (15) or (16) relates to said method, wherein step (ii) is conducted at a pressure in the range of from 500 to 2000 mbar, preferably at a pressure in the range of from 800 to 1500 mbar, more preferred at a pressure in the range of from 900 to 1200 mbar, more preferred at a pressure in the range of from 950 to 1100 mbar.

A further preferred embodiment (18) concretizing any one of embodiments (15) to (17) relates to said method, wherein step (ii) is conducted in an atmosphere comprising more than 5 volume-%, preferably more than 10 volume-%, more preferred more than 15 volume-%, more preferred more than 20 volume-%, of oxygen, based on the total composition of the atmosphere, more preferred in ambient atmosphere (i.e. under air).

A further preferred embodiment (19) concretizing any one of embodiments (15) to (18) relates to said method, wherein step (ii) is conducted at a temperature in the range of from 50 to 300° C.

A further preferred embodiment (20) concretizing any one of embodiments (15) to (19) relates to said method, wherein step (ii) is conducted for a period of time of more than 5 minutes, preferably of more than 30 minutes, more preferred more than 1 hour.

A further preferred embodiment (21) concretizing any one of embodiments (15) to (20) relates to said method, wherein step (ii) is conducted for a period of time of less than 72 hours, preferably less than 48 hours, more preferred less than 24 hours.

A further preferred embodiment (22) concretizing any one of embodiments (15) to (21) relates to said method, wherein step (ii) is conducted for a period of time in the range of from 5 minutes to 72 hours, preferably in the range of from 30 minutes to 48 hours, more preferred in the range of from 1 to 24 hour(s).

A further preferred embodiment (23) concretizing any one of embodiments (15) to (22) relates to said method, wherein the at least one catalyst C comprised in the catalytic composition according to step (b) comprises at least one ionic liquid A further preferred embodiment (24) concretizing any one of embodiments (15) to (23) relates to said method, wherein the polymer according to (i) which has at least one, preferably at least two, functional groups which are reactive towards isocyanate groups, is preferably selected from the group of polyester, polyether, polycarbonate, polyacrylate, polymethacrylates and mixtures of two or more of these polymers.

A further preferred embodiment (25) concretizing any one of embodiments (15) to (24) relates to said method, wherein (iii) is done in bulk (without solvent) or in solution in a suitable solvent or solvent mixture that is non-reactive towards NCO, preferably a solvent selected from the group consisting of benzene, toluene, xylene, dioxane and mixtures of two or more of these solvents.

An embodiment (26) of the present invention relates to a modified polymer obtained or obtainable according to the method of any one of embodiments (15) to (25).

An embodiment (27) of the present invention relates to the uretdione of formula (II) as defined in any one of embodiments (15) to (25).

As already mentioned above, it is explicitly noted that the preceding set of embodiments does not determine the extent of protection, but represents a suitably structured part of the description directed to general and preferred aspects of the present invention.

CITED LITERATURE

A. Davis, Dimerisation and Trimerisation of 2,4 Tolylene Di-isocyanate, Die Makromolekulare Chemie, 1963, 196-204

P. Singh, J. L. Boivin, Canadian Journal of Chemistry, 1962, 935-940

N. Risch, U. Westerwelle, J. Kiene, R. Keuper, Preparation, Characterization and Selective Reactions of Novel [1,3] Diazetidine-2,4-diones (Uretdiones)—A New Route to Generate Assymetric Substituted Toluylenediisocyanate-Derivatives, J. Prakt. Chem, 1999, 341, 616-619

E. Querat, L. Tighzert, J. P. Pascault, K. Dusek, Die Angewandte Makromolekulare Chemie, 242, 1996, 1-36

WO 03/093343A1

P. J. Flory, J. Am. Chem. Soc. 1952, 74, 2718

A. Sunder et al., Chem. Eur. J. 2000, 6, No. 1, 1-8

H. Frey et al., Chem. Eur. J. 2000, 6, No. 14, 2499

H. Frey et al., Acta Polym. 1997, 48, 30

ROMPP, Chemisches Lexikon [Chemical Lexicon], Online Version 3.0

"Ion Exchangers" by F. De Dardel and T. V. Arden, published in Ullmann's Encyclopedia of Industrial Chemistry, Electronic Release 2007

WO 2020/016276 A1

ROMPP, Chemisches Lexikon [Chemical Lexicon], Online Version 3.0

"Ion Exchangers" by F. De Dardel and T. V. Arden, published in Ullmann's Encyclopedia of Industrial Chemistry, Electronic Release 2007

WO 2005/026234 A1

DE 10138216

DE 10147712

US 2010/298490 A1

US 2006/052527 A1

US 2010/152404 A1

The invention claimed is:

1. A process for preparing a polymer comprising a structural element —N—C(═O)—$X^2$—, the process comprising:

(a) providing an uretdione of formula (I)

(I)

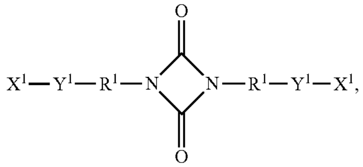

wherein $R^1$ is selected from the group consisting of:

branched and unbranched C1 to C20-alkylene groups;

substituted and unsubstituted C4 to C20-cycloalkyl groups, wherein a substituted C4 to C20-cycloalkyl group has one or more substituents independently selected from the group consisting of branched and unbranched C1 to C8-alkyl groups, wherein each C4 to C20-cycloalkyl group is either directly bonded to $Y^1$ or is bonded via a $CH_2$ group to $Y^1$, and is either directly bonded to the nitrogen atom of the uretdione structure or via a $CH_2$ group;

C1 to C5 alkyl-bridged dicyclohexyl groups;

substituted and unsubstituted C6 to C14-aryl groups, wherein a substituted C6 to C14-aryl group has one or more substituents independently selected from the group consisting of branched and unbranched C1 to C8-alkyl groups;

C1 to C5-alkyl-bridged di-C6 to C14-aryl groups, wherein each C6 to C14-aryl group is unsubstituted or substituted with one or more substituents independently selected from the group consisting of branched and unbranched C1 to C8-alkyl groups;

$X^1$ is a group reactive towards isocyanates, $Y^1$ is a linker group, wherein $Y^1$ is absent or selected from the group consisting of —NH—C(═O)—[$R^2$—]—, —NH—C(═O)—O—[$CH_2$]$_n$—, —NH—C(═O)—O—[$R^1$]$_n$—, each with the nitrogen-atom being attached to $R^1$, —[$CH_2$]$_n$—, —[$R^2$]—, —NH—C(═O)—NH—[$R^1$]$_n$—, —[$R^1$]$_n$—, —NH—C(═O)—NH-cyclohexyl-, which has at least one $CH_3$ group on the cyclohexyl ring, —NH-cyclohexyl-, which has at least one $CH_3$ group on the cyclohexyl ring, —NH—C(═O)—$NR^3$—[$R^1$]$_n$—, —[$R^1$]$_n$—, —NH—C(═O)—$NR^3$-cyclohexyl which has at least one $CH_3$ group on the cyclohexyl ring, —$NR^3$-cyclohexyl-, which has at least one $CH_3$ group on the cyclohexyl ring, and $R^1$;

wherein $R^1$ is as defined above, $R^2$ is a polyetherpolyol residue having on each side a terminal oxygen atom based on ethylene oxide, propylene oxide, butylene oxide, or a mixture thereof, with 1-100 repeating units, or —[$(CH_2)_4$—O]$_r$— with r being an integer in the range of from 1-100; or a mixture of polyetherpolyol residues having on each side a terminal oxygen atom based on ethylene oxide, propylene oxide, butylene oxide, or a mixture thereof with p repeating units, and —[$(CH_2)_4$—O]$_r$, wherein a sum of p and r is an integer in the range of from 1-100, $R^3$ is selected from the group consisting of methyl group, ethyl group, propyl group, isopropyl group, butyl group, iso-butyl group, ethyl hexyl group, and benzyl group; and n is zero or an integer in the range of from 1 to 12; and (b) ring opening the uretdione of formula (I) provided according to (a) at a temperature of more than 50° C., in the presence of a catalyst composition comprising at least one catalyst C, wherein the at least one catalyst C comprises one or more ionic liquids, which are salts of the following formula (I)

$$[A]_n^+[Y]^{n-}, \quad (I)$$

wherein n is an integer in the range of from 1 to 4;

$[A]^+$ is a quaternary ammonium cation, which comprises a five or six membered heterocycle, which comprises at least one nitrogen atom and optionally an oxygen atom or a sulfur atom, wherein the nitrogen atom of the heterocycle is quaternised with t $C_1$-$C_{18}$ alkyl residues; and $[Y]^{n-}$ is a mono-, di-, tri-, or tetra-valent anion;

thereby obtaining the polymer comprising the structural element —N—C(═O)—$X^2$, wherein $X^2$ is a derivative of the group $X^1$ reactive towards isocyanates; and wherein the one or more ionic liquids are combined with one or more co-catalyst, wherein the one or more co-catalyst is selected from the group consisting of organometallic catalyst, tertiary amine catalyst, and a mixture of organometallic catalyst and tertiary amine catalyst.

2. The process according to claim 1, wherein in the uretdione of formula (I), $X^1$ is a hydroxyl group and $Y^1$ is selected from the group consisting of —NH—C(═O)—[$R^2$]—, —NH—C(═O)—O—[$CH_2$]$_n$—, —NH—C(═O)—O—[$R^1$]$_n$—, —[$CH_2$]$_n$—, and —[$R^2$]—, wherein n, $R^1$, and $R^2$ are as defined in claim 1; or $X^1$ is a $NH_2$ group and $Y^1$ is selected from the group consisting of —NH—C(═O)—NH—[$R^1$]$_n$—, —[$R^1$]$_n$—, —NH—C(═O)—NH-cyclohexyl-, which has at least one $CH_3$ group on the cyclohexyl ring, and —NH-cyclohexyl, which has at least one $CH_3$ group on the cyclohexyl ring, wherein n and $R^1$ are as defined in claim 1; or $X^1$ is a $NHR^3$ group and $Y^1$ is selected from the group consisting of NH—C(═O)—$NR^3$—[$R^1$]$_n$—, —[$R^1$]$_n$—, —NH—C(═O)—$NR^3$-cyclohexyl which has at least one $CH_3$ group on the cyclohexyl ring, and —$NR^3$-cyclohexyl-, which has at least one $CH_3$ group on the cyclohexyl ring, wherein n, $R^1$, and $R^3$ are as defined in claim 1.

3. The process according to claim 1, wherein in the uretdione of formula (I), $R^1$ is selected from the group consisting of —[$CH_2$]$_m$— group with m being an integer in the range of from 3 to 20, 1,2-phenylene group, 1,3-phenylene group, and 1,4-phenylene group, optionally substituted with one or more substituents selected from the group consisting of methyl group, cyclohexylene, and $CH_2$-cyclohexylene group, wherein a cyclohexylene ring of the cyclohexylene or $CH_2$-cyclohexylene group is optionally substituted with one or more methyl groups, and —$CH_2$-bridged di-C6-aryl group.

4. The process according to claim 1, wherein (b) is conducted at a pressure in the range of from 500 to 2000 mbar.

5. The process according to claim 1, wherein (b) is conducted in an atmosphere comprising more than 5 volume-% of oxygen, based on a total composition of the atmosphere, or wherein (b) is conducted in a protective atmosphere.

6. The process according to claim 1, wherein the one or more ionic liquids in the at least one catalyst C comprised in the catalyst composition is selected from the group consisting of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethylimidazolium bromide (EDMIM-Br), 1-(2-hydroxyethyl)-3-methyl imidazolium chloride (HEMIM-Cl), butyl-1-methylpiperidinium acetate (BMPM acetate), and a mixture of two or more thereof.

7. A polymer comprising the structural element —N—C(═O)—$X^2$—, obtained from the process according to claim 1.

8. A method for modifying polymers, which have reactive groups towards isocyanate groups, the method comprising:

(i) providing a polymer having at least one functional group reactive towards isocyanate groups;

(ii) providing an uretdione of formula (II)

(II)

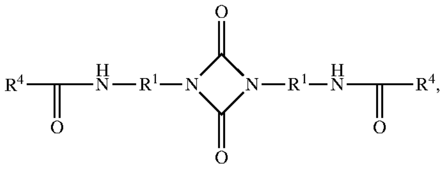

wherein $R^4$ is a $Y^2$—$R^5$ group, wherein $Y^2$ is a single oxygen atom —O—, or $Y^2$ is —$NR^3$— with $R^3$ being selected from the group consisting of hydrogen atom, methyl group, ethyl group, propyl group, isopropyl group, butyl group, iso-butyl group, ethyl hexyl group, and benzyl group; and $R^5$ is selected from the group consisting of branched and unbranched C1 to C20-alkylene groups;

substituted and unsubstituted C3 to C20-cycloalkyl groups, wherein a substituted C3 to C20-cycloalkyl group has one or more substituents independently selected from the group consisting of branched and unbranched C1 to C8-alkyl groups, wherein each C3 to C20-cycloalkyl group is either directly bonded to $Y^2$ or is bonded via a $CH_2$ group to $Y^2$;

substituted or unsubstituted C6 to C14-aryl groups, wherein a substituted C6 to C14-aryl group has one or more substituents independently selected from the group consisting of branched and unbranched C1 to C8-alkyl groups;

C1 to C5-alkyl-bridged di-C6 to C14-aryl groups, wherein each C6 to C14-aryl group is unsubstituted or substituted with one or more substituents independently selected from the group consisting of branched and unbranched C1 to C8-alkyl groups; and isobornyl, bornyl, and menthyl;

or $R^4$ is selected from the group consisting of:

acrylate and methacrylate, an esterification product of diol with acrylic acid and/or methacrylic acid; wherein the diol is selected from the group consisting of ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediol, cyclohexanediol, cyclohexane dimethanol, isosorbitol, hydroxypivalinic acid neopentylglycol ester, inositol, inositol derivative, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, difunctional polyetherpolyol based on ethylene oxide, propylene oxide, butylene oxide, and a mixture thereof, with 1-100 repeating units;

an esterification product of polytetrahydrofuran with acrylic acid and/or methacrylic acid with 1-100 repeating units, an esterification product of acrylic acid and/or methacrylic acid with at least one polyol having three or more hydroxyl groups, and a mixture of two or more thereof;

$R^1$ is selected from the group consisting of:

branched and unbranched C1 to C20-alkylene groups;

substituted and unsubstituted C4 to C20-cycloalkyl groups, wherein a substituted C4 to C20-cycloalkyl group has one or more substituents independently selected from the group consisting of branched and unbranched C1 to C8-alkyl groups, wherein each C4 to C20-cycloalkyl group is either directly bonded to the nitrogen atom of the —NH— unit or is bonded via a $CH_2$ group to the nitrogen atom of the —NH— unit, and is either directly bonded to the nitrogen atom of the uretdione structure or via a $CH_2$ group;

C1 to C5 alkyl-bridged dicyclohexyl groups;

substituted and unsubstituted C6 to C14-aryl groups, wherein a substituted C6 to C14-aryl group has one or more substituents independently selected from the group consisting of branched and unbranched C1 to C8-alkyl groups;

C1 to C5-alkyl-bridged di-C6 to C14-aryl groups, wherein each C6 to C14-aryl group is unsubstituted or substituted with one or more substituents independently selected from the group consisting of branched and unbranched C1 to C8-alkyl groups;

(iii) reacting the polymer having at least one functional group reactive towards isocyanate groups of (i) with the uretdione of formula (II) of (ii)

at a temperature of more than 50° C., in the presence of a catalyst composition comprising at least one catalyst C, wherein the at least one catalyst C comprises one or more ionic liquids, which are salts of the following formula (I)

$$[A]_n^+ [Y]^{n-}, \qquad (I)$$

wherein n is an integer in the range of from 1 to 4;

$[A]^+$ is a quaternary ammonium cation, which comprises a five or six membered heterocycle, which comprises at least one nitrogen atom and optionally an oxygen atom or a sulfur atom, wherein the nitrogen atom of the heterocycle is quaternised with t C1-C18 alkyl residues; and $[Y]^{n-}$ is a mono-, di-, tri-, or tetra-valent anion.

9. The method for modifying polymers having reactive groups towards isocyanate groups according to claim 8, wherein in the uretdione of formula (II), $R^1$ is selected from the group consisting of an unbranched C3 to C20-alkylene group, $[CH_2]_m$-group with m being an integer in the range of from 3 to 20, 1,2-phenylene group, 1,3-phenylene group, and 1,4-phenylene group, optionally substituted with one or more substituents selected from the group consisting of methyl group, cyclohexylene, and —$CH_2$-cyclohexylene group, wherein a cyclohexylene ring of the cyclohexylene or $CH_2$-cyclohexylene group is optionally substituted with one or more substituents selected from the group consisting of methyl group and —$CH_2$-bridged di-C6-aryl group.

10. The method for modifying polymers having reactive groups towards isocyanate groups according to claim 8, wherein (ii) is conducted at a pressure in the range of from 500 to 2000 mbar; and/or wherein (ii) is conducted in an atmosphere comprising more than 5 volume-% of oxygen, based on a total composition of the atmosphere.

11. The method for modifying polymers having reactive groups towards isocyanate groups according to claim 8, wherein the one or more ionic liquids in the at least one catalyst C comprised in the catalyst composition is selected from the group consisting of 1-ethyl-3-methyl imidazolium bromide (EMIM-Br), 1-benzyl-3-methyl imidazolium chloride (BEMIM-Cl), 1-butyl-1-methylpiperidinium chloride (BMPM-Cl), 1-ethyl-2,3-dimethylimidazolium bromide (EDMIM-Br), 1-(2-hydroxyethyl)-3-methyl imidazolium chloride (HEMIM-Cl), butyl-1-methylpiperidinium acetate (BMPM acetate), and a mixture of two or more thereof.

12. The method for modifying polymers having reactive groups towards isocyanate groups according to claim 11, wherein the at least one catalyst C comprises the one or more ionic liquids and one or more co-catalyst, wherein the one or more co-catalyst is selected from the group consisting of organometallic catalyst, tertiary amine catalyst, and a mixture of organometallic catalyst and tertiary amine catalyst.

13. A modified polymer, obtained according to the method of claim 8.

14. The process according to claim 1, wherein in the structural element —N—C(═O)—$X^2$, $X^2$ is selected from the group consisting of oxygen atom (—O—), —NH— group, and —$NR^3$—;

wherein $R^3$ is selected from the group consisting of methyl group, ethyl group, propyl group, isopropyl group, butyl group, iso-butyl group, ethyl hexyl group, and benzyl group.

15. The process according to claim 3, wherein $R^1$ is selected from the group consisting of

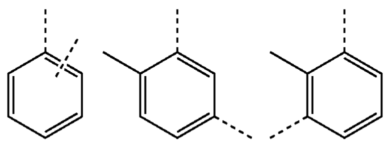

-continued

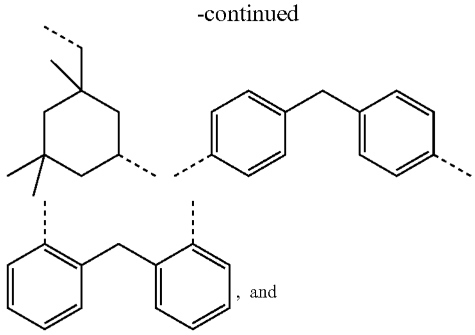

, and

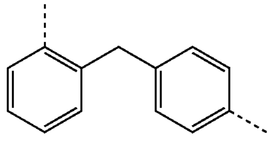

, wherein dotted lines represent bonds towards $Y^1$ and towards the nitrogen atom of a central uretdione structure.

16. The process according to claim 5, wherein (b) is conducted in an inert gas atmosphere, wherein the inert gas selected from the group consisting of helium, neon, argon, krypton, xenon, nitrogen, and a mixture of two or more thereof.

17. The method for modifying polymers having reactive groups towards isocyanate groups according to claim 8, wherein the polymer in (i) has at least two functional groups which are reactive towards isocyanate groups.

18. The method for modifying polymers having reactive groups towards isocyanate groups according to claim 9, wherein $R^1$ is selected from the group consisting of

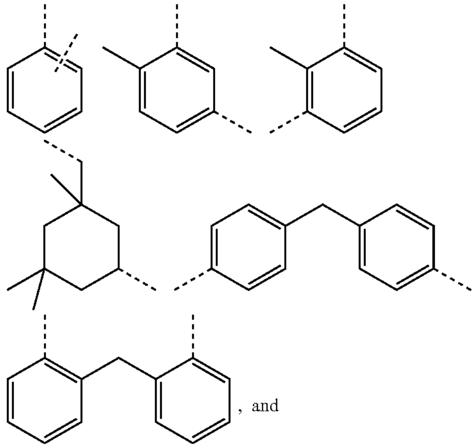

, and

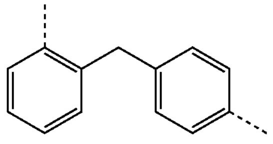

, wherein dotted lines represent bonds towards a —NH— unit and towards the nitrogen atom of a central uretdione structure.

* * * * *